United States Patent [19]

Ito

[11] Patent Number: 4,890,904
[45] Date of Patent: Jan. 2, 1990

[54] ZOOM LENS SYSTEM CAPABLE OF WIDE-ANGLE VIEWING FOR HIGH ZOOM RATIO

[75] Inventor: Takayuki Ito, Tokyo, Japan

[73] Assignee: Asahi Kogaku Kogyo Kabushiki Kaisha, Tokyo, Japan

[21] Appl. No.: 51,421

[22] Filed: May 19, 1987

[30] Foreign Application Priority Data

May 19, 1986 [JP]  Japan .................................. 61-115487
Sep. 13, 1986 [JP]  Japan .................................. 61-216831

[51] Int. Cl.4 .......................... G02B 15/14; G02B 9/64
[52] U.S. Cl. ................................................. 350/427
[58] Field of Search ........................................ 350/427

[56] References Cited

U.S. PATENT DOCUMENTS 4,523,814  6/1985  Okudaira ............................. 350/427

Primary Examiner—John K. Corbin
Assistant Examiner—Rebecca D. Gass
Attorney, Agent, or Firm—Sughrue, Mion, Zinn, Macpeak & Seas

[57] ABSTRACT

A zoom lens system capable of wide-angle viewing for a high zoom ratio has four lens groups, all of which change the focal length of the overall system while the position of the image plane is held constant. The second lens group comprises a negative lens element having a concave surface of large curvature on the image side, a biconcave negative lens element that is cemented to a positive lens element to provide a cemented surface that has a large curvature and which is convex toward the object, and a negative lens element whose surface on the object side has a large curvature and is concave toward the object. The fourth lens group comprises a front subgroup having a positive focal length which is composed of one or two positive lens elements having a convex surface on the object side and at least one negative lens element, a middle subgroup composed of a negative lens element that is cemented to a positive lens element to provide a cemented surface that has a large curvature and which is divergent and convex toward the object, and a rear subgroup composed of a positive lens element and a negative meniscus lens element whose surface on the object side has a large curvature and is concave toward the object.

12 Claims, 16 Drawing Sheets

ZOOM LENS SYSTEM CAPABLE OF WIDE-ANGLE VIEWING FOR HIGH ZOOM RATIO

BACKGROUND OF THE INVENTION

The present invention relates to a zoom lens system for use with a 35-mm still camera that features a very high zoom ratio ca. 5 to 6 in consideration of its use with such camera and which is capable of imaging over a broad range of half view angles from the wide-angle end to the telephoto end.

Conventional zoom lens system for use with 35-mm still cameras have generally featured zoom ratios in the range of from 2 to 3. However, the demand of users for higher zoom ratios is still growing today and products that feature zoom ratios of 4 to 6 have come into existence as a result of manufacturing them so as to satisfy specifications that are very stringent in consideration of their use with 35-mm still cameras.

The following products have been proposed as zoom lens systems that are capable of wide-angle viewing for high zoom ratios.

(1) A zoom lens system that attains a zoom ratio of 2-3 and which features a half view angle of approximately 15° at the long focal distance end.

Zoom lens systems in this class are of the two-group type wherein the front group is negative and the rear group is positive, or the four-group type which is a variant of the two-group type wherein the positive rear group is divided into three sub-groups which are positive, negative and positive. Whichever of these types is chosen, zoom lens systems of this first class are basically of the retrofocus type and an increase in the diameter of the last lens is inevitable if an attempt is made to attain zoom ratios of 3 or more or to provide an enhanced telephoto performance.

(2) A zoom lens system that attains a zoom ratio of 3-5 and which features a half view angle of approximately 9° at the long focal distance end.

Unlike those of the first class, zoom lens systems in this class do not use a negative first lens group and consist of either three groups which are positive, negative and positive, four groups which are positive, negative, positive and positive, or five groups which are positive, negative, positive, negative and positive. In the systems of this class, almost all of the lens group are displaced for achieving zooming, though the second, or third or fifth lens group is sometimes designed to be fixed. However, the zoom ratio of up to 5 and the half view angle of 9° that is attainable at the long focal distance end are not completely satisfactory. Also, the half view angle at the wide angle end, for example, 32° is not satisfactory.

(3) A zoom lens system that attains a zoom ratio of more than 5 a half view angle of approximately 38° at the short focal distance end and a half view angle of approximately 9° at the long focal length end.

There are few systems that belong to this class except for those described in Example 1 of Japanese patent application (OPI) No. 161804/1982 (the term "OPI" as used herein means an unexamined published Japanese patent application), Example 2 of Japanese patent application (OPI) No. 161824/1982, Examples 1 to 4 of Japanese patent application (OPI) No. 127908/1983 and in Japanese patent application (OPI) No. 14213/1985. The second lens group of each of the systems shown in these patents is either of the three-unit-five-element or four-unit-five element configuration and probably because of high optical load to be carried by the second lens group, these prior art systems experience great variations in coma abberration and astigmatism during zooming.

(4) A zoom lens system that attains a zoom ratio of 4-5, a half view angle of approximately 38° at the short focal distance end and a half view angle of approximately 9° at the long focal length end.

There are many systems that belong to this class as shown in Unexamined Published Japanese patent application Nos. 4018/1982, 202416/1983, 211117/1983 and 211118/1983. Each one of the systems in this class consists of five lens groups which are positive, negative, positive, negative and positive. In addition, these systems require a complicated mechanism for effecting zooming as illustrated by the use of a special cam device for allowing the first and second lens groups to be displaced ensemble, or the need to displace the third, fourth and fifth lens groups en masse.

OBJECTS AND SUMMARY OF THE INVENTION

An object, therefore, of the present invention is to provide a zoom lens system that is capable of wide-angle viewing for a high zoom ratio. This zoom lens system is compact and has such a high performance that when used with a 35-mm still camera, this lens system alone is sufficient to cover a broad range of view angles from the wide-angle end to the telephoto end as well as featuring a very high zoom ratio of approximately 6. This system is capable of realizing the commonly employed viewing range of from a half view angle of approximately 32° at the short focal distance end (corresponding to a focal length of 35 mm) to approximately 6° at the long focal distance end (corresponding to a focal length of about 200 mm).

Another object, therefore, of the present invention is to provide a zoom lens system that is capable of wide-angle viewing for a high zoom ratio. This zoom lens system is compact and has such a high performance that when used with a 35 mm still camera, this lens system alone is sufficient to cover a broad range of view angles from a wide-angle end to the telephoto end as well as featuring a very high zoom ratio of approximately 5. This system is capable of realizing the commonly employed viewing range of from a half view angle of approximately 38° at the short focal distance end (corresponding to a focal length of 28 mm) to approximately 9° at the long focal distance end (corresponding to a focal length of about 135 mm).

DETAILED DESCRIPTION OF THE INVENTION

Figure 1:
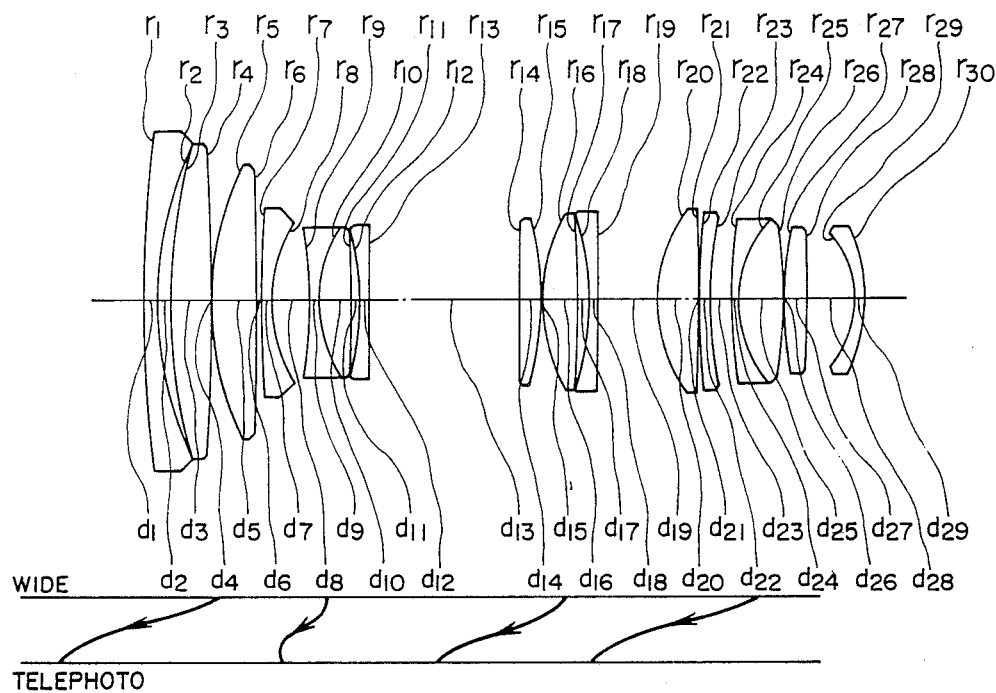
FIGS. 1, 3, 5, 7, 9, 11, 13 and 15 are simplified cross-sectional views of the lens systems that are fabricated in examples 1 to 8, respectively, and which are at the short focal distance end.
Figure 2A:
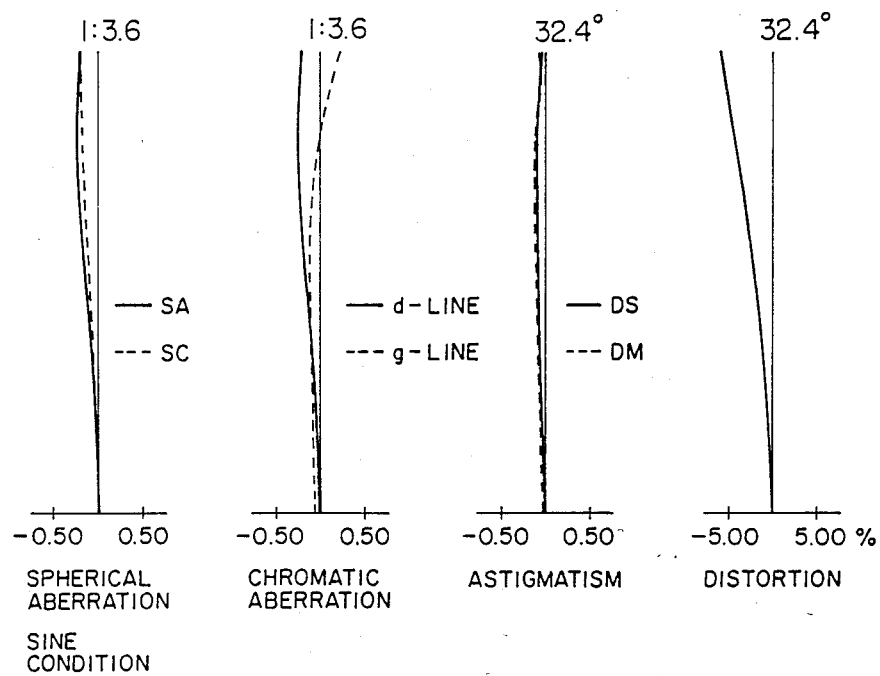
FIGS. 2a-2c, 4a-4c, 6a-6c, 8a-8c, 10a-10c, 12a-12c, 14a-14c, and 16a-16c plotting the aberration curves obtained at the short focal distance end (a), the intermediate focal distance end (b), and the long focal distance end (c), from the lens systems of Examples 1 to 8, respectively.
Figure 2B:
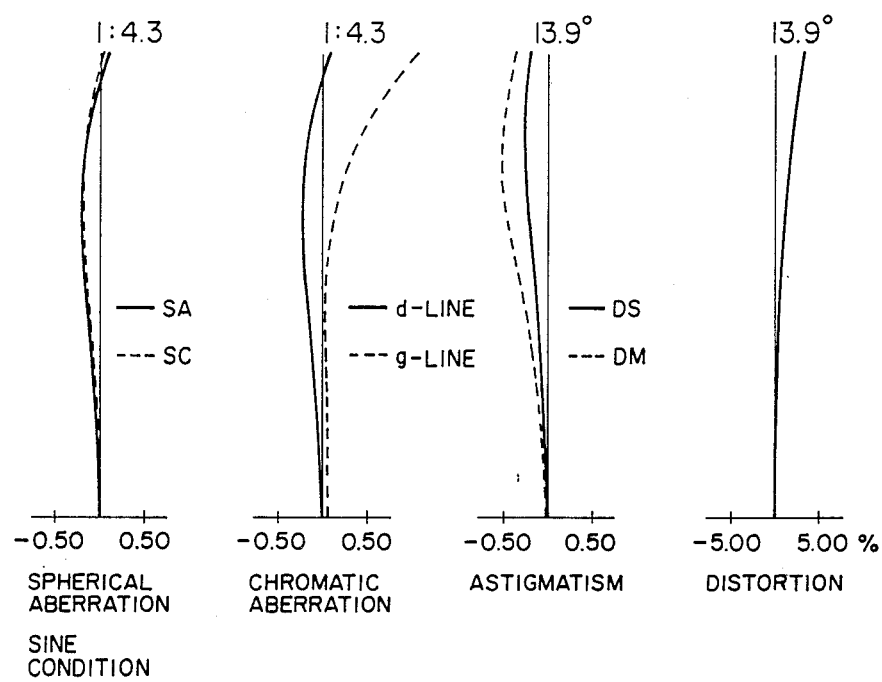
Figure 2C:
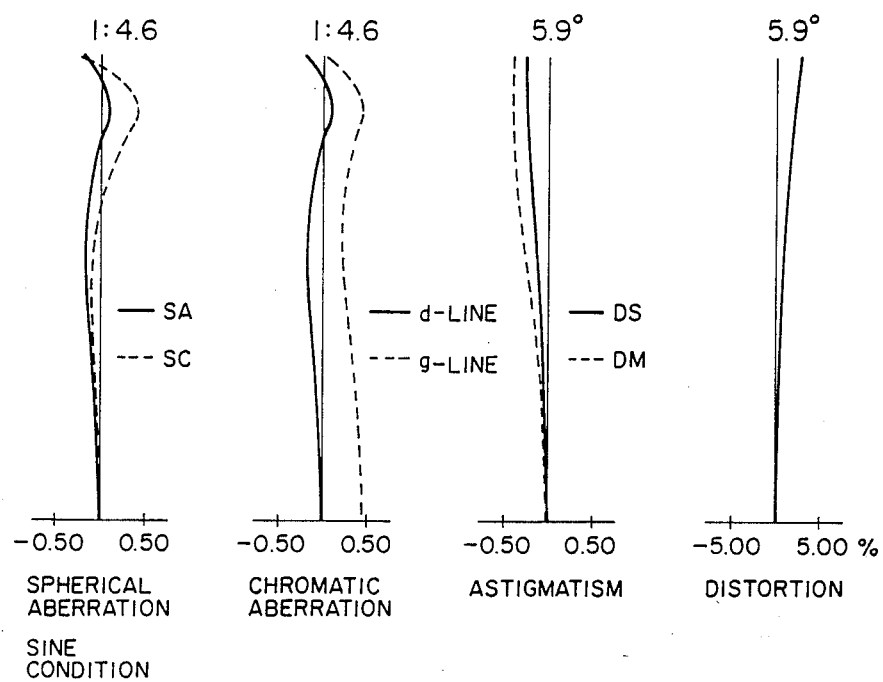
Figure 3:
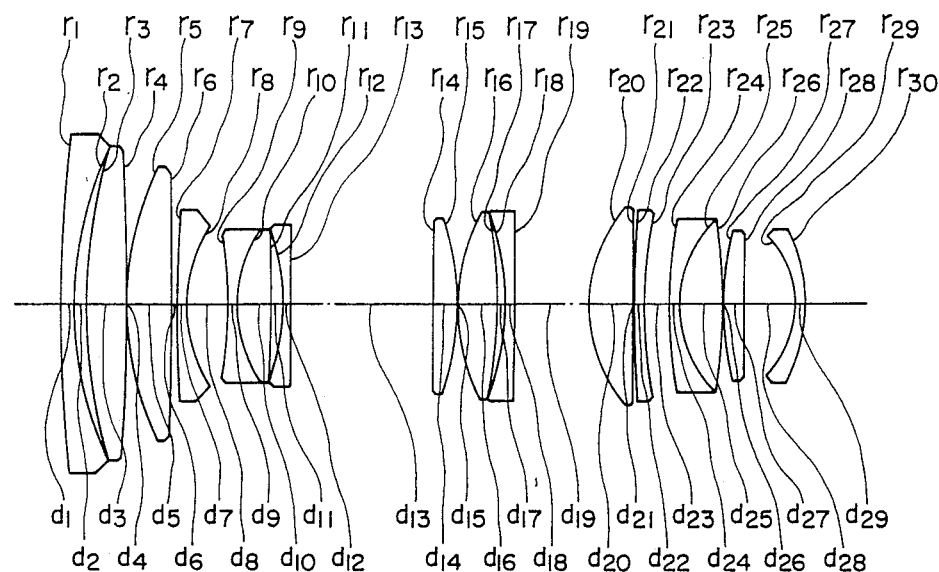
Figure 4A:
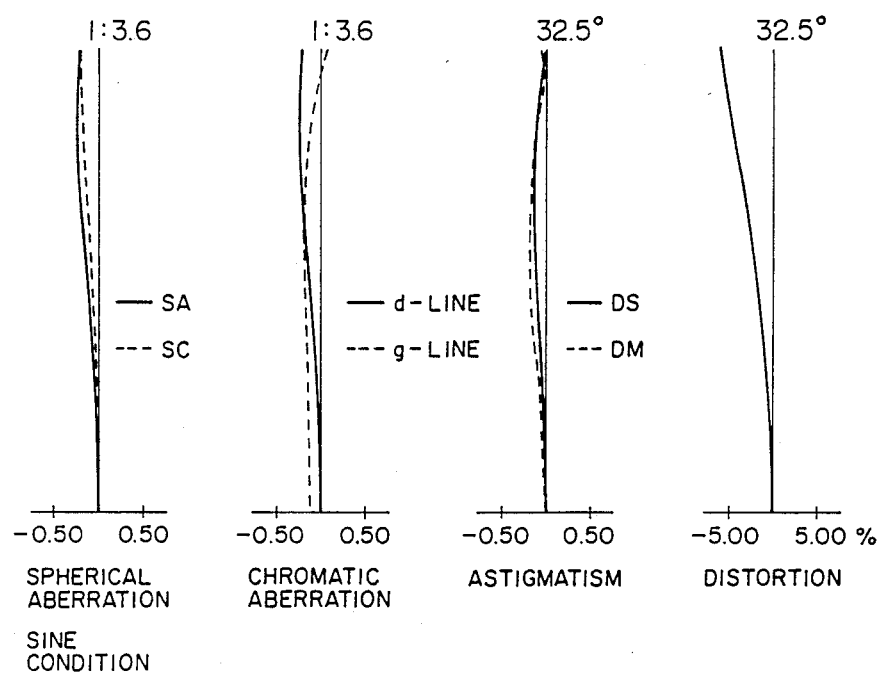
Figure 4B:
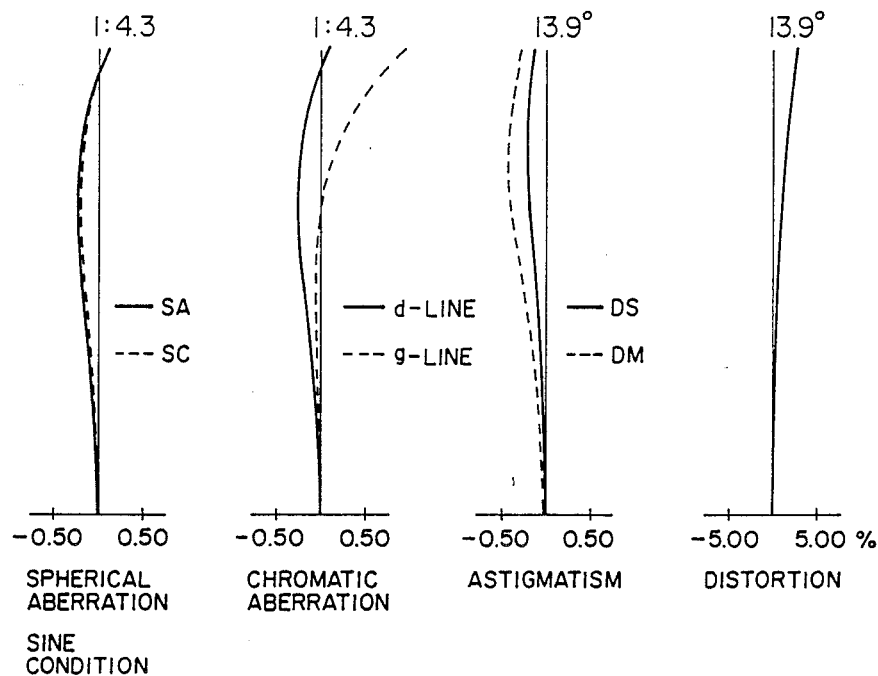
Figure 4C:
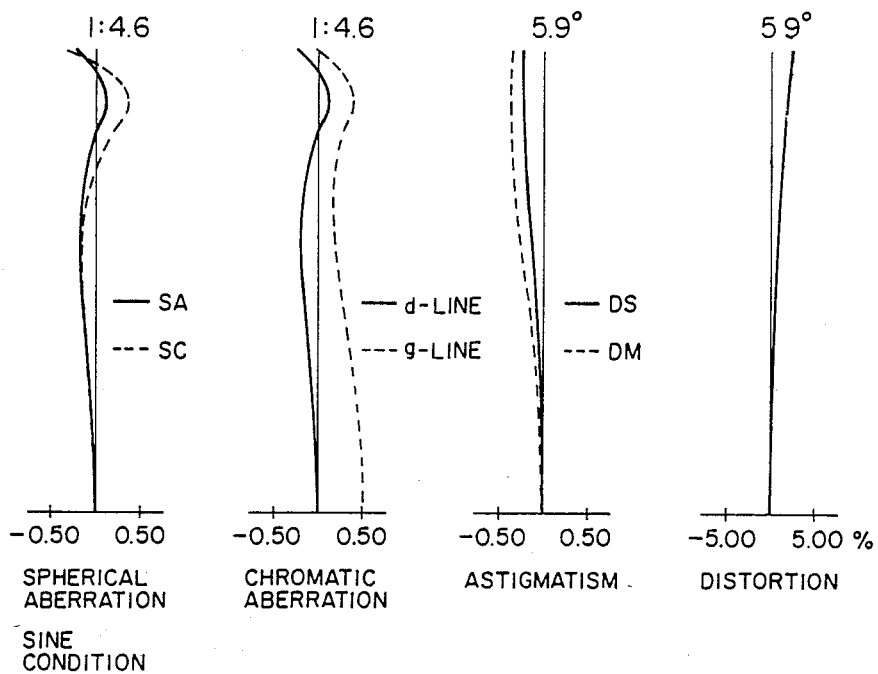
Figure 5:
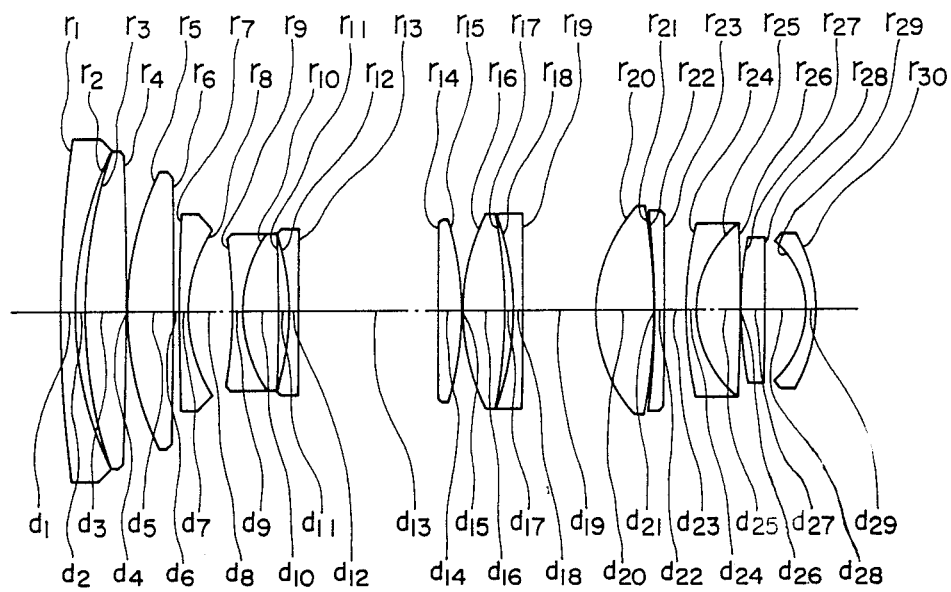
Figure 6A:
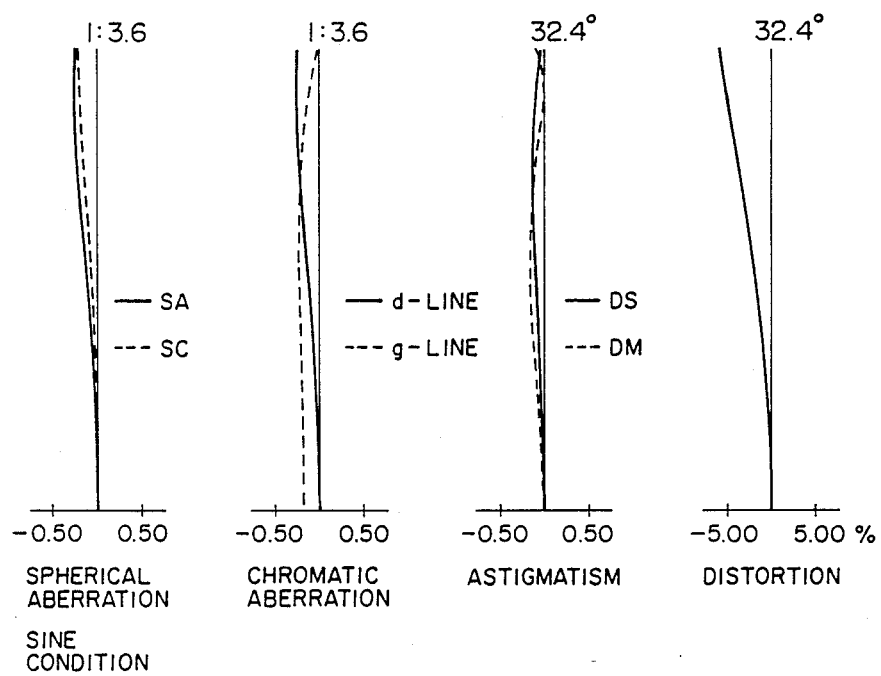
Figure 6B:
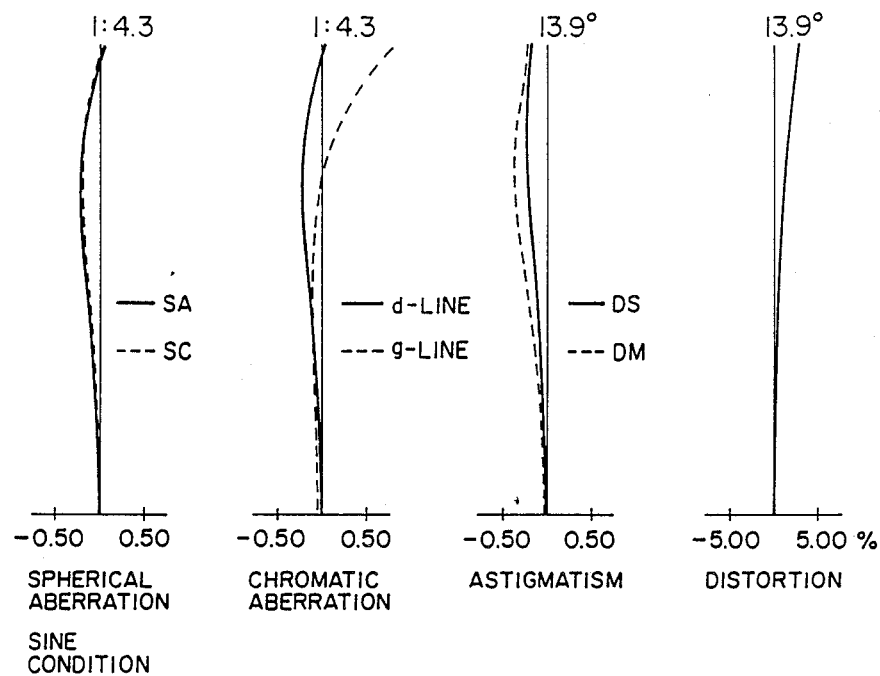
Figure 6C:
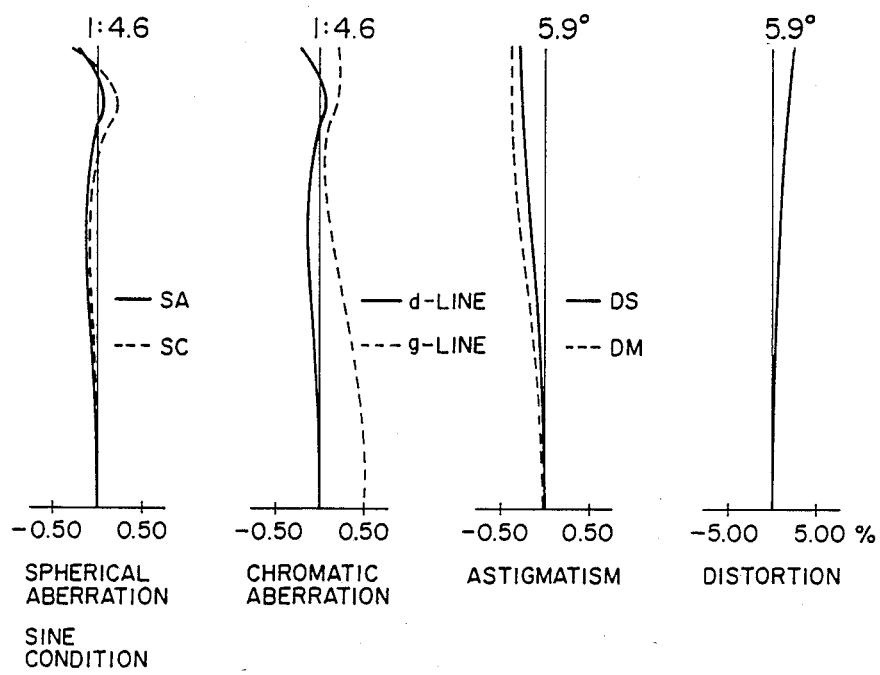
Figure 7:
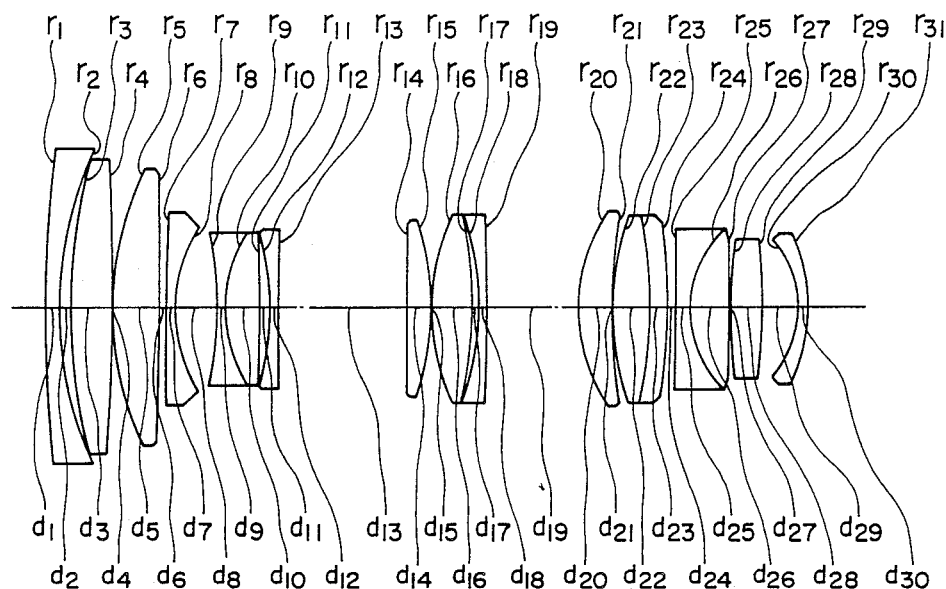
Figure 8A:
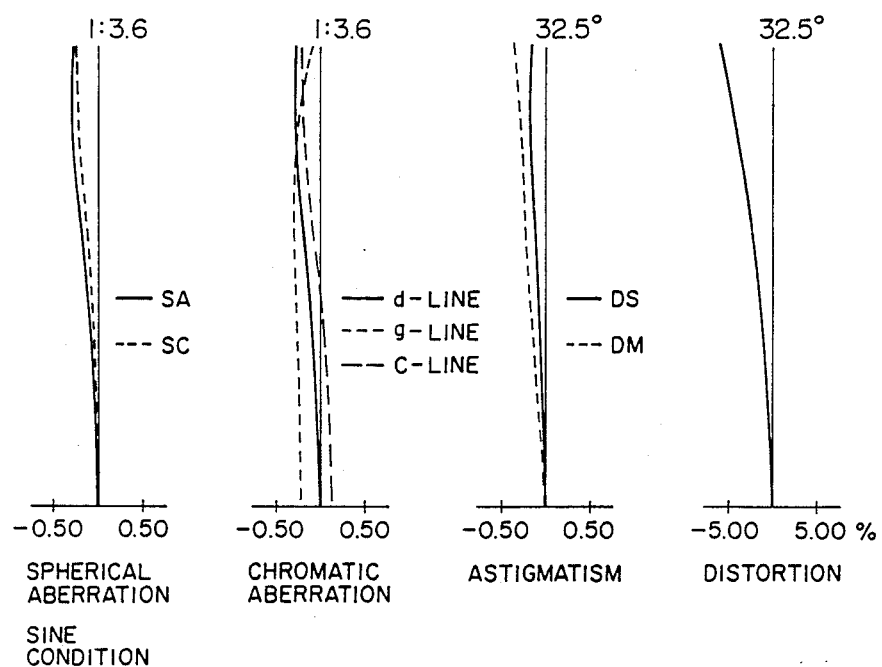
Figure 8B:
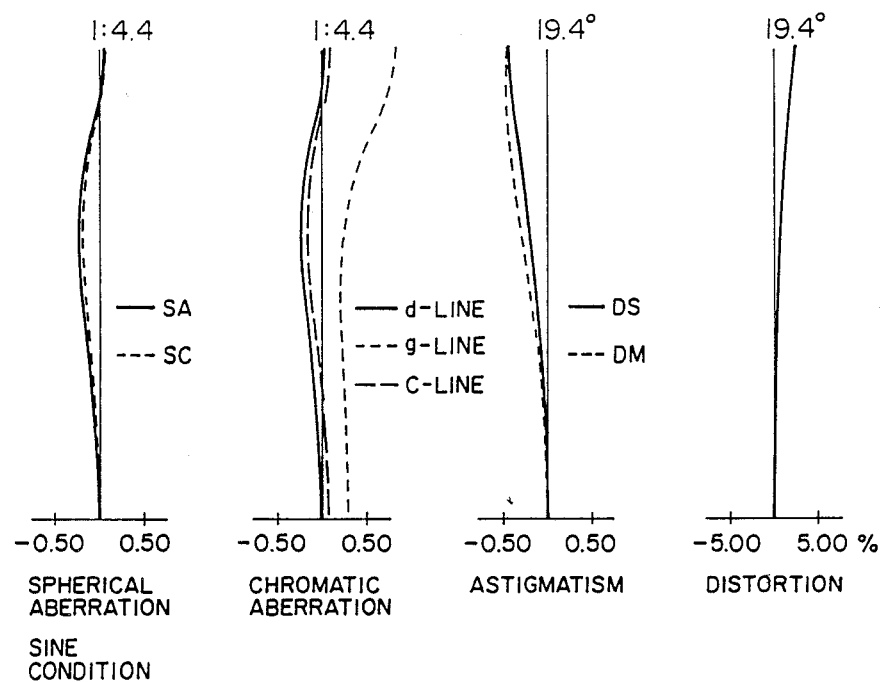
Figure 8C:
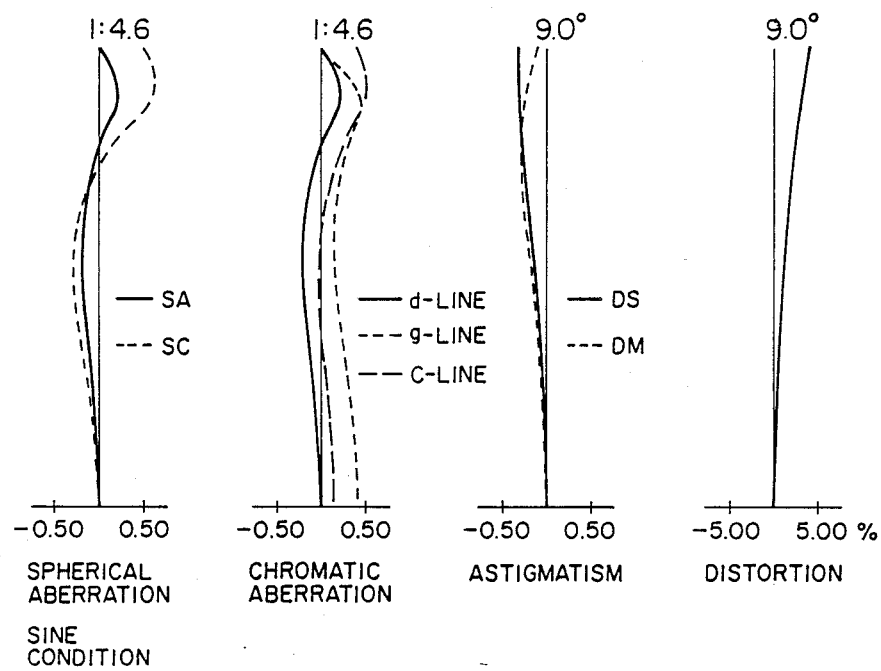
Figure 9:
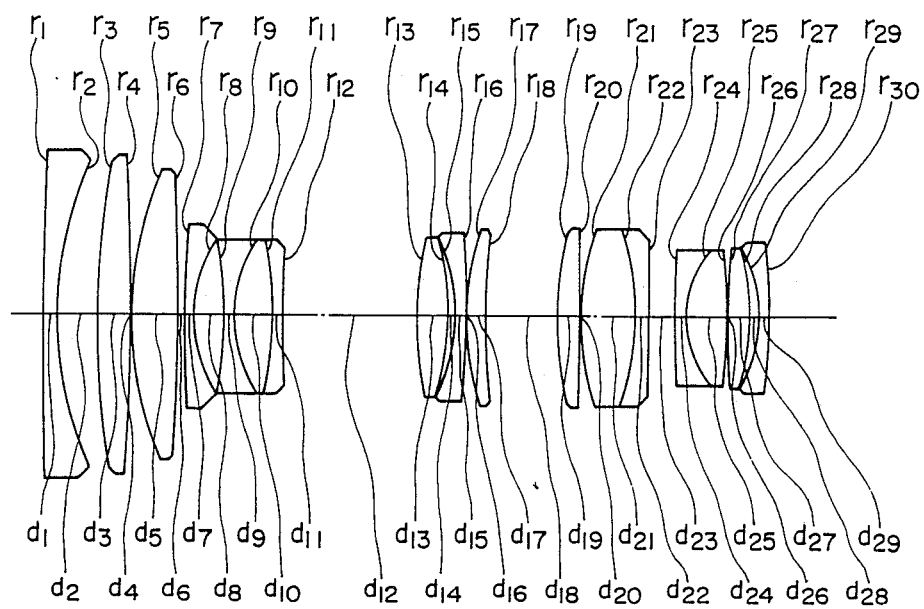
Figure 10A:
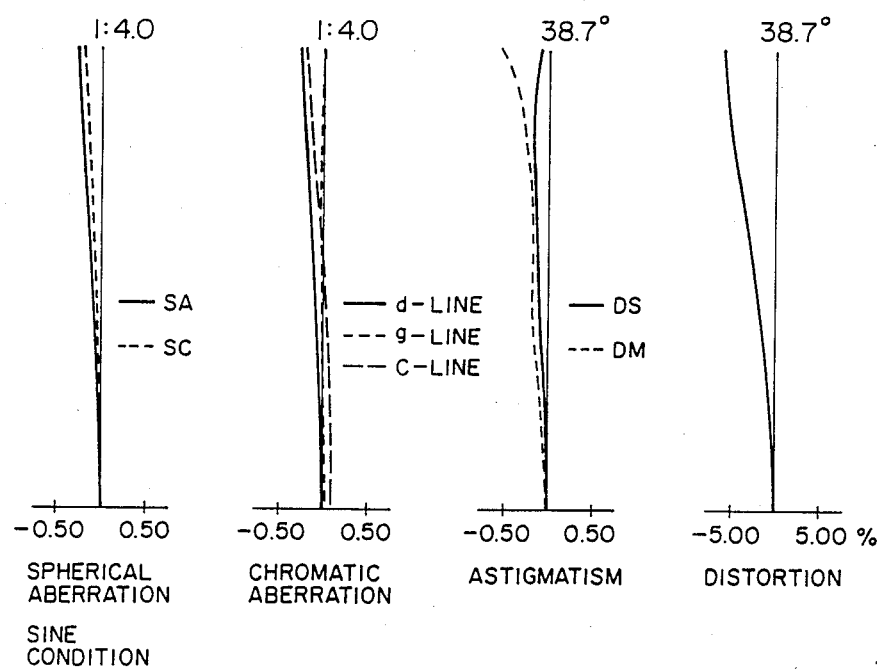
Figure 10B:
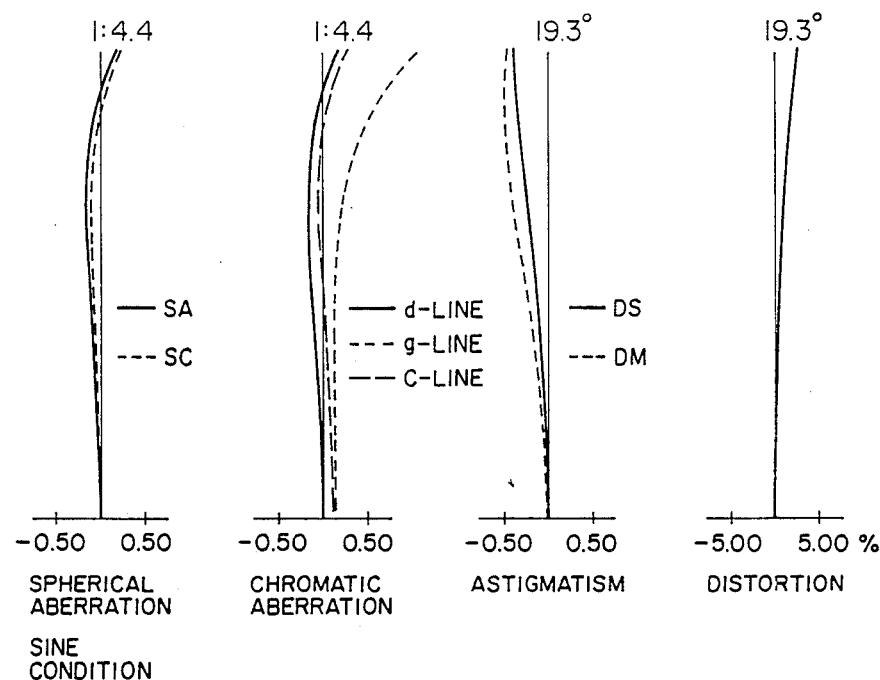
Figure 10C:
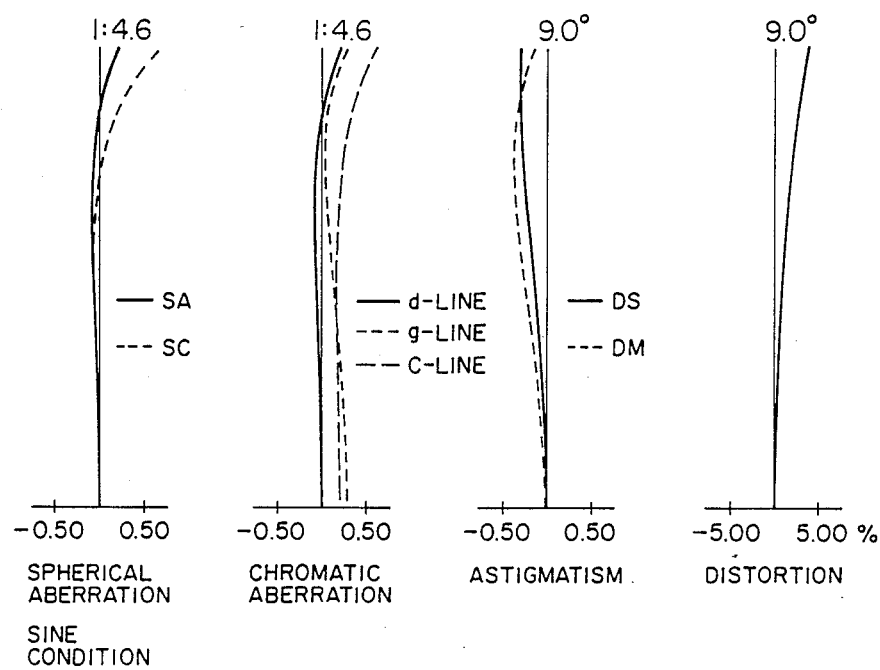
Figure 11:
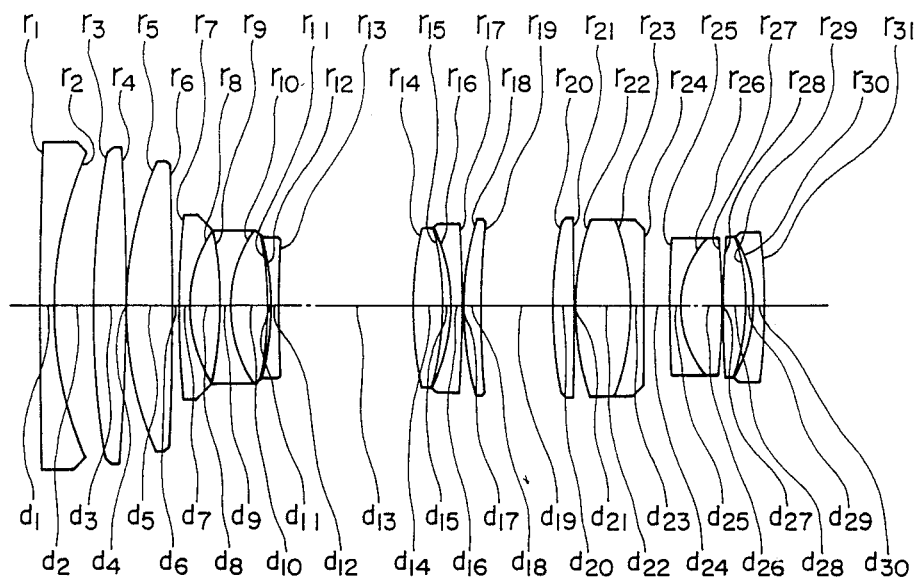
Figure 12A:
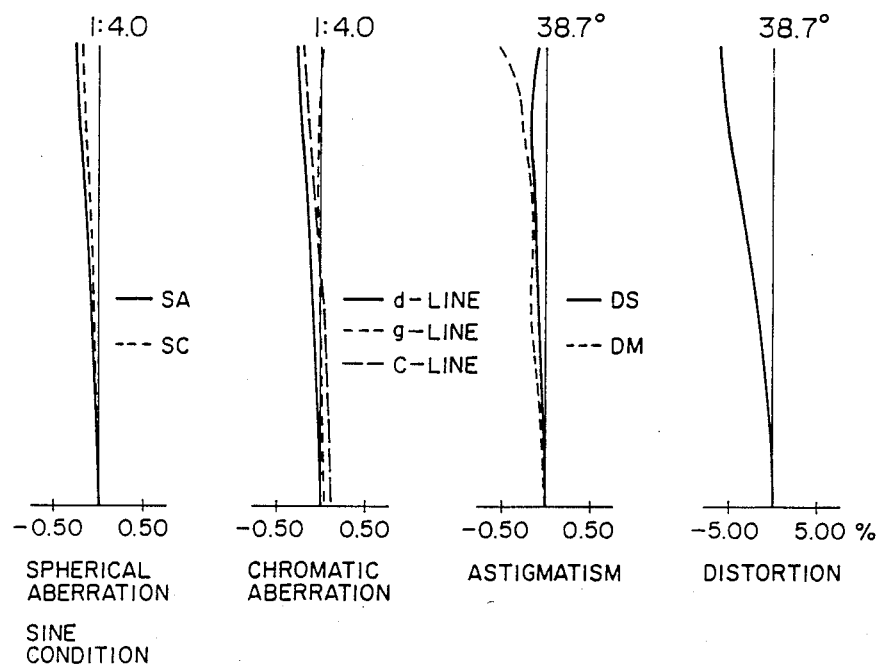
Figure 12B:
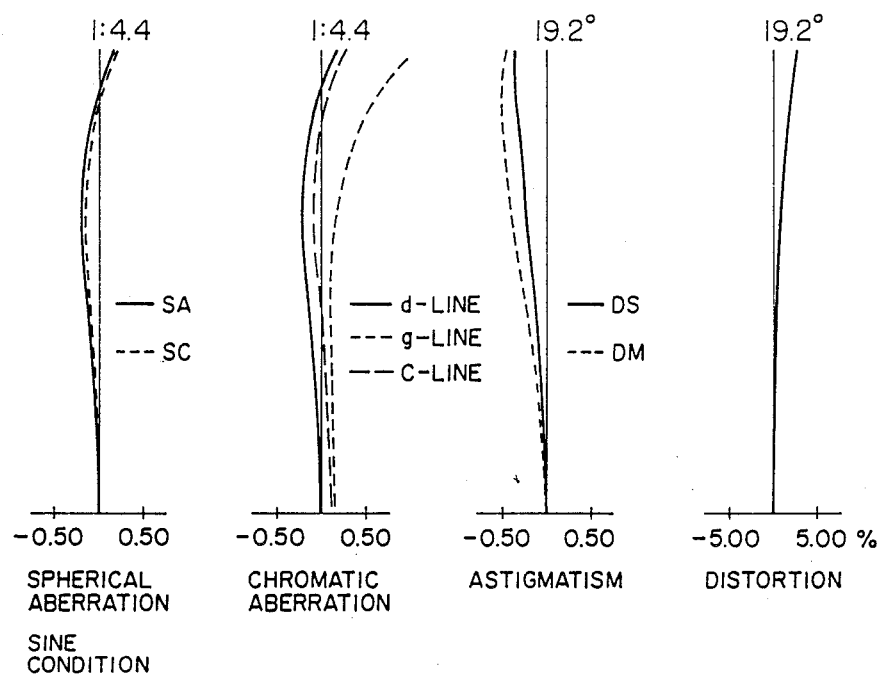
Figure 12C:
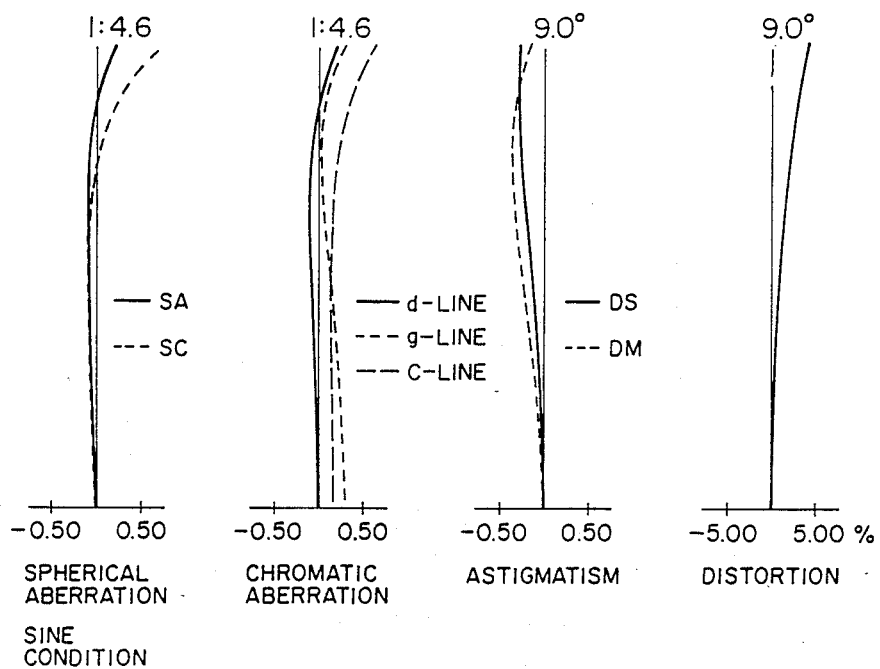
Figure 13:
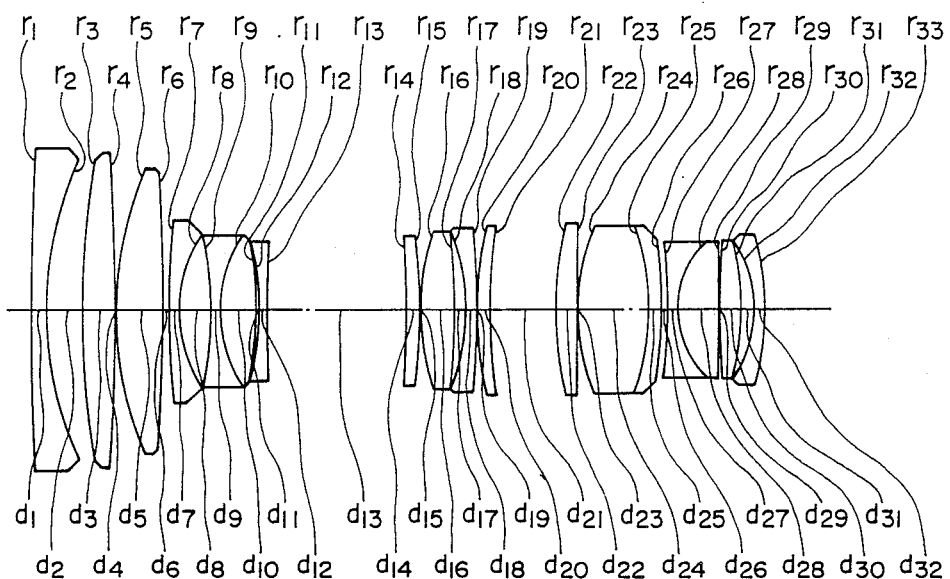
Figure 14A:
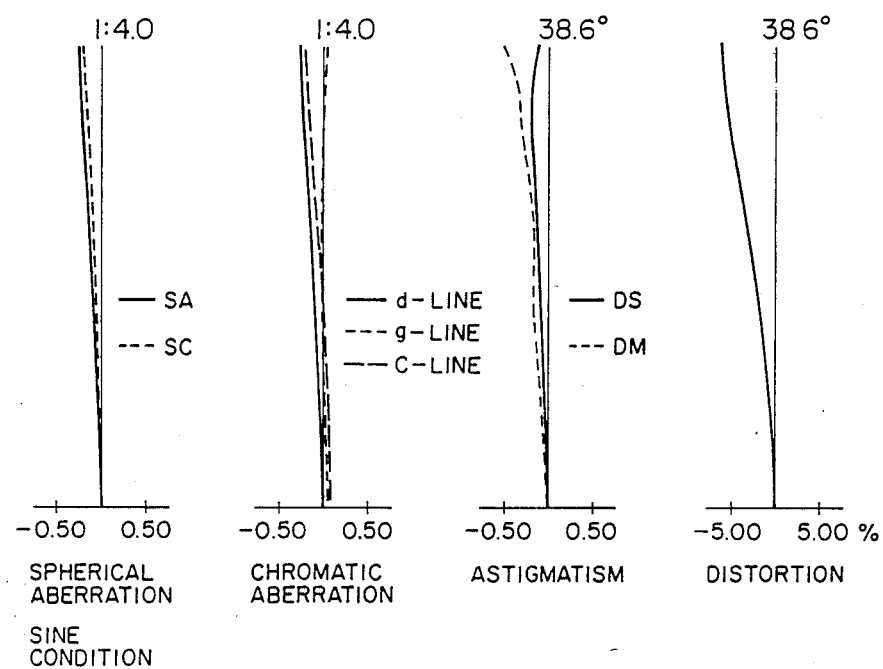
Figure 14B:
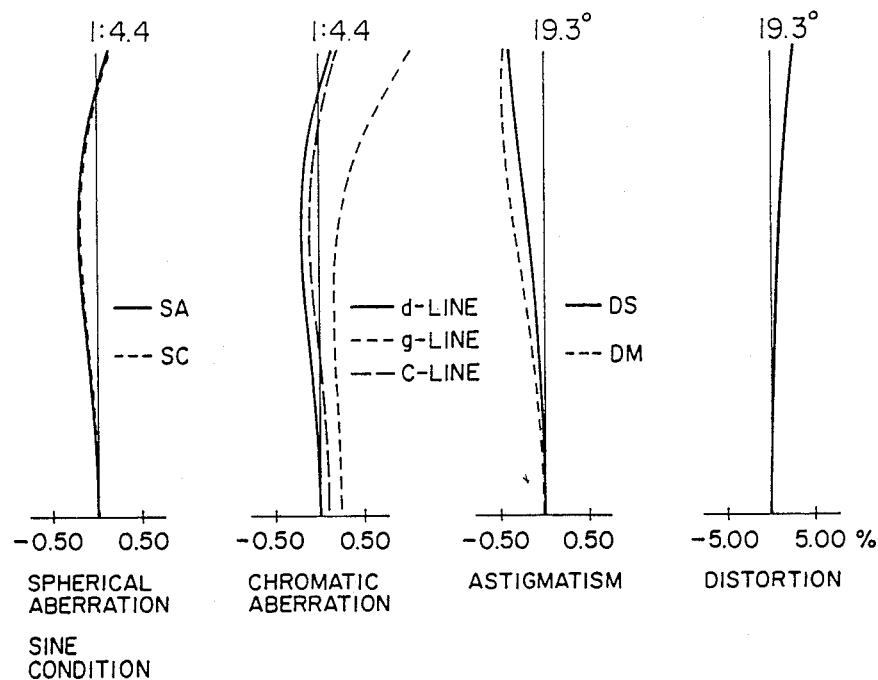
Figure 14C:
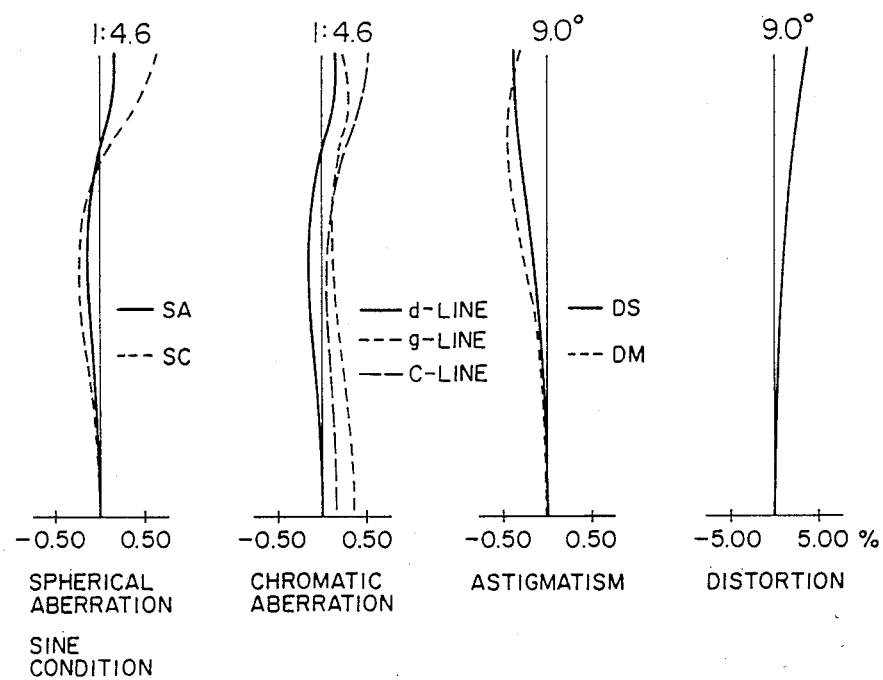
Figure 15:
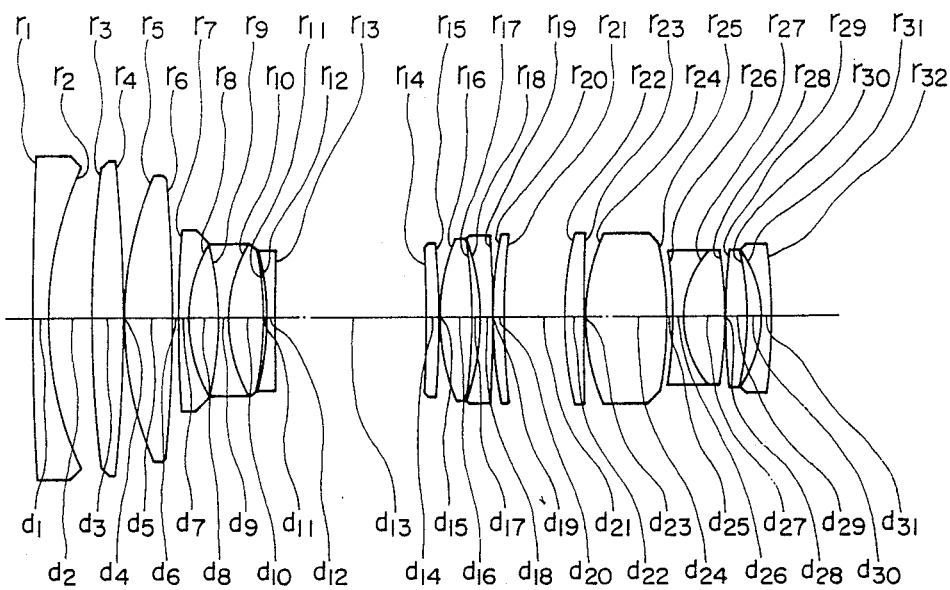
Figure 16A:
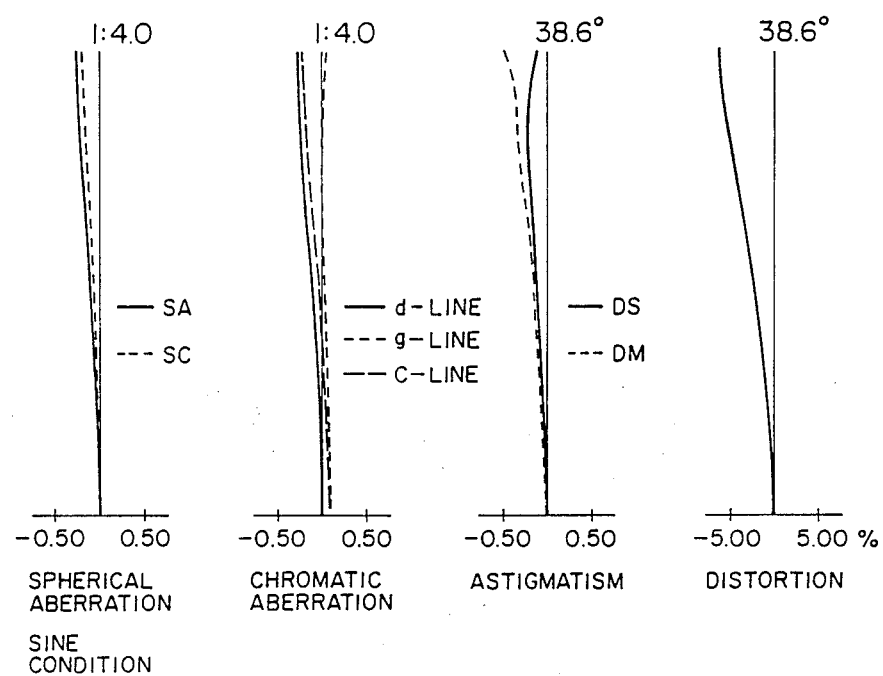
Figure 16B:
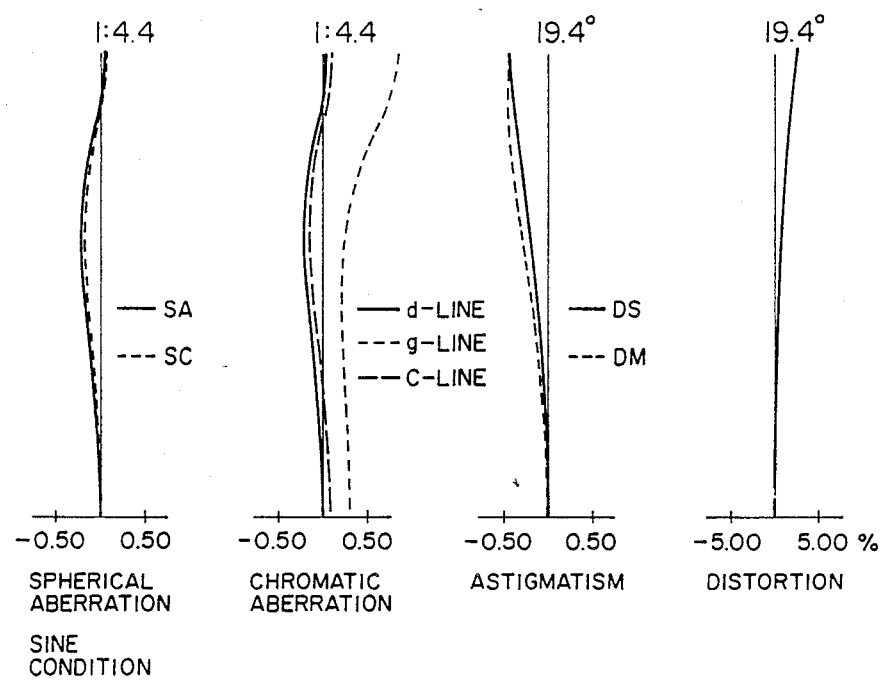
Figure 16C:
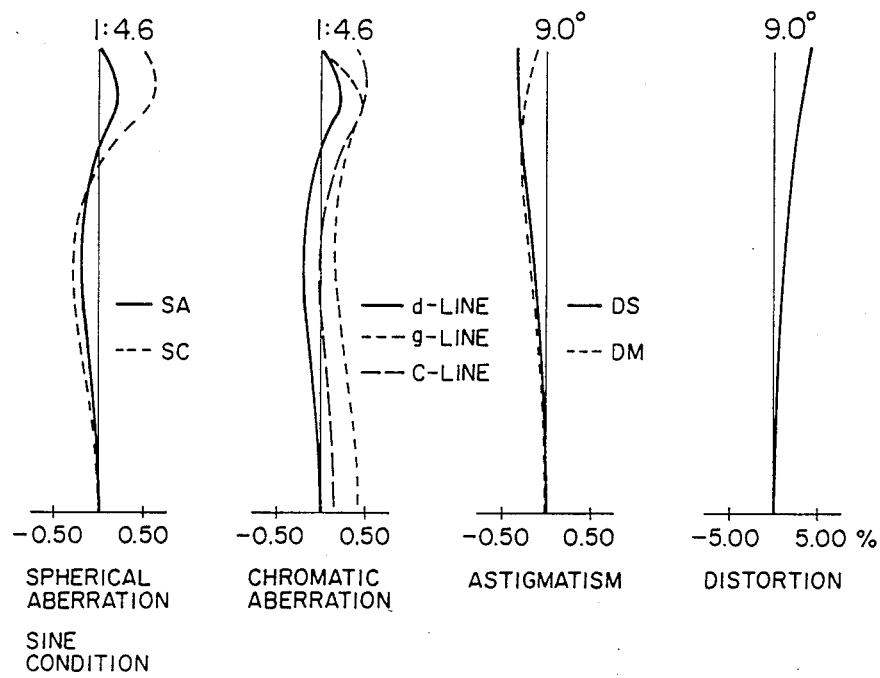

The present invention provides a zoom lens system capable of wide-angle viewing for a high zoom ratio that comprises, in order from the object side, a first lens group having a positive focal length, a second lens group having a negative focal length, a third lens group having a positive focal length, and a fourth lens group having a positive focal length, with all of these lens groups being displaced to change the focal length of the overall system while the position of the image place is held constant, characterized in that:

said first lens group comprises, in order from the object side, a negative meniscus lens element having a convex surface directed toward the object and two positive lens elements;

said second lens group is of the three-unit-four-element configuration and comprises, in order from the object side, a negative lens element having a concave surface of large curvature on the image side, a biconcave negative lens element that is cemented to a positive lens element to provide a cemented surface that has a large curvature and which is convex toward the object, and a negative lens element whose surface on the object side has a large curvature and is concave toward the object; said third lens group comprises, in order from the object side, two positive lens elements and a negative lens element whose surface on the object side has a large curvature and is concave toward the object;

said fourth lens group comprises, in order from the object side, a front subgroup having a positive focal length which is composed of one or two positive lens elements having a convex surface on the object side and at least one negative lens element, a middle subgroup composed of a negative lens element that is cemented to a positive lens element to provide a cemented surface that has a large curvature and which is divergent and convex toward the object, and a rear subgroup composed of a positive lens element and a negative meniscus lens element whose surface on the object side has a large curvature and is concave toward the object;

said lens system satisfying the following conditions:

$$0.0 < X_{IIIL}/X_{IL} < 0.4 \quad (1)$$

$$1.7 < \overline{N_{IIn}} \quad (2)$$

$$0.08 < r_{IIC}/f_L < 0.15 \quad (3)$$

$$0.09 < r_{IVIa}/f_L < 0.18 \quad (4)$$

$$0.07 < r_{IVC}/f_L < 0.14 \quad (5)$$

$$-0.12 < r_{IVEa}/f_L < -0.06 \quad (6)$$

where $X_{IL}$: the amount of displacement for bringing the first lens group to be positioned at the long focal distance end;

$X_{IIL}$: the amount of displacement for bringing the second lens group to be positioned at the long focal distance end;

$\overline{N_{IIn}}$: the average of the refractive indices, at the d-line, of the negative lens elements in the second lens group;

$f_L$: the focal length of the overall system when it is at the long focal distance end;

$r_{IIC}$: the radius of curvature of the cemented surface of the cemented lens in the second lens group;

$r_{IVIa}$: the radius of curvature of the surface on the object side of the positive lens element that is closest to the object of the lens elements in the fourth lens group;

$r_{IVC}$: the radius of curvature of the cemented surface of the middle subgroup (cemented lens) of the fourth lens group; and $r_{IVEa}$: the radius of curvature of the surface on the object side of the negative lens element that is closest to the image of the lens elements in the fourth lens group.

In a preferred embodiment of the present invention, the first, third and fourth lens groups are so designed that they make a monotonic movement toward the object when they are displaced from the short focal distance end to the long focal distance end, and the overall lens system satisfies the following condition:

$$0.5 < X_{IIIL}/X_{IVL} < 0.9 \quad (7)$$

where $X_{IIIL}$: the amount of displacement for bringing the third lens group to be positioned at the long focal distance end; and $X_{IVL}$: the amount of displacement for bringing the fourth lens group to be positioned at the short focal distance end.

In another preferred embodiment, the first and fourth lens groups are displaced ensemble for performing zooming.

In the zoom lens system of the present invention, all of the four lens group incorporated in it are displaced for achieving zooming. The first lens group serves two purposes, one being for attaining a focus and the other for cooperating with the second lens group to achieve zooming. The second and fourth lens groups have substantially equal zooming capabilities. The function of the third lens group is not to attain zooming but rather to provide a higher degree of image flatness during zooming in association with the fourth lens group.

In most of the prior art zoom lens systems, the second lens group has to be displaced toward the image for shifting from the short to long focal distance end and this imposes an unduly large load on the second lens group. The second lens group in the system of the present invention has one or two inflection points at an intermediate focal distance (see FIG. 1) but at the long focal distance end, the second lens group should be positioned closer to the object side than when it is at the short focal distance end.

Another aspect of the present invention provides a zoom lens system capable of wide-angle viewing for a high zoom ratio that comprises, In order from the object side, a first lens group having a positive focal length, a second lens group having a negative focal length, a third lens group having a positive focal length, and a fourth lens group having a positive focal length, with all of these lens groups being displaced to change the focal length of the overall system while the position of the image plane in held constant, characterized in that:

said second lens group is of the three-unit-four-element configuration and comprises, in order from the object side, a negative lens element having a concave surface of large curvature on the image side, a biconcave negative lens element that is cemented to a positive lens element to provide a cemented surface that has a large curvature and which is convex toward the object, and a negative lens element whose surface on the object side has a large curvature and is concave toward the object, or of the two-unit-four-element configuration in which three of the four elements that are on the image side are cemented together;

said third lens group comprises, in order from the object side, one or two positive lens elements, a negative lens element whose surface on the object side has a large curvature and is concave toward the object, and a positive lens element whose surface on the object side is convex toward the object;

said fourth lens group comprises, in order from the object side, a front subgroup having a positive focal length which is either of the two-unit-three-element configuration that is composed of a positive lens element having a convex surface on the object side, and a positive cemented lens formed of a biconvex lens element and a negative lens element, or of the two-unit-two-element configuration that is composed of a positive lens element having a convex surface on the object side and a single positive lens element, a middle subgroup composed of a negative lens element that is cemented to a positive lens element to provide a cemented surface that has a large curvature and which is divergent and convex toward the object, and a rear subgroup composed of a positive lens element and a negative meniscus lens element whose surface on the object side has a large curvature and is concave toward the object;

said lens system satisfying the following conditions:

$1.7 < \overline{N}_{IIn}$ (2)

$0.1 < r_{IIC}/f L < 0.25$ (3')

$0.3 < r_{IVIa}/f_L < 0.6$ (4')

$0.07 < r_{IVC}/f_L < 0.16$ (5')

$-0.2 < r_{IVEa}/f_L < -0.1$ (6')

$1.05 < X_{IL}/X_{IVL} < 1.5$ (8)

$0.2 < r_{IIIEa}/f_L > 0.7$ (9)

where $X_{IL}$: the amount of displacement for bringing the first lens group to be positioned at the long focal distance end;

XIVL: the amount of displacement for bringing the fourth lens group to be positioned at the long focal distance end; and rIIIEa: the radius of curvature of the surface on the object side of the positive lens element that is closest to the image of the lens elements in the third lens group;

In the zoom lens system of the other aspect of present invention, at the long focal distance end, the second lens group is desirably positioned substantially the same as where it is positioned when it is at the short focal distance end, or closer to the object side.

Conditions (1), (2) and (3) or (3') relate to preferable conditions for the second lens group. Condition (1) specifically relates to the displacement of the second lens group. If the lower limit of this condition is not reached, the position of the second lens group at the long focal distance end will be closer to the image than when it is at the short focal distance end. As a result, the second lens group has to carry an increased load in zooming and the balance between the second and fourth lens groups in zooming capability will be upset to cause increased variations in coma aberration and astigmatism during zooming, which are too large to be effectively compensated by the three-unit-four-element configuration of the second lens group. If the upper limit of condition (1) is exceeded, the required amounts of displacement of the first and fourth lens groups are increased to provide a situation that is unfavorable for the purpose of reducing the overall size of the system. In addition, the load that has to be carried by the fourth lens group becomes so great as to present difficulty in achieving compensation for higher-order spherical aberration and field curvature.

Condition (2) relates to the average refractive index of the negative lens elements in the second lens group. If the lower limit of this condition is not reached, there is a high likeli-hood that the Petzval sum will assume a negative value. A particularly undesirable problem that occurs in this case is that the astigmatism developing in the sagittal direction at a maximum view angle at the short focal distance end has a great chance of assuming a positive value.

Condition (3) and (3') relates to the cemented surface of the cemented lens in the second lens group, or the convergent surface in the second lens group which is a convergent group. In some of the prior art systems, this convergent surface is not cemented but is separated into a negative and a positive lens; in such a case, however, the two surfaces facing each other have a curvature large enough to increase the chance of the occurrence of higher-order aberrations. Therefore, the convergent surface in the second lens group should be cemented. If the upper limit of condition (3) or (3') is exceeded, the effect of the cemented surface as a convergent surface is decreased and the aberrations that occur in the second lens group diverge too much to be effectively compensated for by the third and fourth lens groups. If the lower limit of condition (3) or (3') is not reached, higher-order aberrations will occur and, in particular, the change in the spherical aberration that develops in the marginal portion at the long focal distance end will become undesirably abrupt.

Conditions (4), (4'), (5), (5'), (6) and (6') all relate to the fourth lens group. Condition (4) or (4') relates to the power of the surface on the object side of the positive lens element which is closest to the object of all lenses in the fourth lens group.

If the upper limit of condition (4), (4') are exceeded, the power of the above-specified surface of the positive lens element which is closest to the object of all lenses in the fourth lens group is so much decreased that it becomes difficult to compensate for the aberrations that have been overcompensated by the second lens group having a large negative power. If the lower limit of condition (4), (4') are not reached, the positive power of said surface will become excessive and the change in spherical aberration that develops in the marginal portion at the long focal distance end will become undesirably abrupt.

Condition (4') is similar to condition (4). Condition (4') relates to the power of the surface on the object side of the positive lens element which is closest to the object of all lenses in the fourth lens group. In case of a third lens group having a positive lens as the final lens element is more advantageous than one having a negative lens not only for the purpose of achieving effective compensation for coma aberration but also for the purpose of ensuring effective compensation for spherical aberration since this enables the reduction in the positive power of the first lens surface in the fourth lens group. In particular, if the lower limit of condition (4') is not reached, the positive power of said surface will become excessive and the change in spherical aberration that develops in the marginal portion at the long focal distance.

Condition (5), (5') relate to the cemented surface in the middle subgroup of the fourth lens group. The overall power of the middle subgroup may be positive or negative, but whichever the case, it is required to have a divergent surface. If the upper limit of condition (5), (5') are exceeded, the effect of this divergent surface is decreased so much that it becomes difficult to achieve effective compensation for the aberrations that have been undercompensated by the fourth lens group having a large positive power. If, on the other hand, the lower limit of condition (5), (5') are not reached, the power of the divergent surface becomes excessive and the chance of the occurrence of higher-order spherical aberrations is increased. In addition, increased variations in spherical and coma aberrations will occur during zooming.

Condition (6), (6') relate to the power of the surface on the object side of the final negative lens element in the fourth lens group and is necessary to ensure the provision of a divergent surface in the fourth lens group as in the case of condition (5), (5'). However, because of the difference in lens position, the effect of condition (6), (6') differs from that of condition (5), (5'). In other words, condition (6), (6') which relate to the lens element which is farther away from the position of the stop diaphragm is more effective for the purpose of compensating for field curvature and distortion. If the lower limit of this condition is not reached, the power of the divergent surface of the final negative lens in the fourth lens group becomes too small to achieve effective compensation for the negative (barrel) distortion that develops in the third lens group and in the front subgroup of the fourth lens group. A particularly great problem that occurs in this instance is that a large negative distortion will develop at the short focal distance end. If the upper limit of condition 6), (6') are exceeded, the power of the divergent surface is increased to provide a favorable condition for the purpose of compensating for the distortion occurring at the short focal distance end. On the other hand, there is a high likelihood that the Petzval sum will become negative to cause overcompensation of field curvature. The use of a negative lens as the final lens element of the fourth lens group leads to the provision of a telephoto configuration in the latter and hence is advantageous for the purpose of attaining further size reduction.

Condition (7) relates to the displacement of the third and fourth lens groups. As already mentioned, the third lens group has nothing to do with the zooming capability and its function is to provide a higher degree of image flatness by undergoing relative displacement with respect to the fourth lens group during zooming. If the upper limit of condition (7) is exceeded, the amount of displacement of the third lens group becomes close to that of the fourth group and the variation in the distance between these two lens groups is decreased to cause overcompensation for astigmatism at the long focal distance end. If the lower limit of condition (7) is not reached, the variation in the distance between the third and fourth lens groups is increased. Although this is favorable for the purpose of compensation for astigmatism, the amount of displacement of the fourth lens group is increased and the diameter of the last lens must be increased in order to attain an F number of about 4.5 at the long focal distance end, which is certainly undesirable for the purpose of reducing the overall size of the system. The increase in the diameter of the last lens also leads to an increased flare and should be avoided.

Condition (8) relates to the amounts of displacement of the first and fourth lens groups and the system of the present invention is characterized in that the first lens group is displaced by a larger amount than the fourth lens group. If the lower limit of condition (8) is not reached, the amount of displacement of the fourth lens group becomes closer to that of the first group; in other words, the fourth lens group must be displaced by an increased amount and this is unfavorable for the purpose of providing a small lens barrel system. If the upper limit of condition (8) is exceeded, a favorable condition for size reduction is attained but, on the other hand, the first lens group comes apart from the fourth group at the long focal distance end and the overall length of the lens system is increased to cause a decrease in the quantity of marginal illumination. In order to ensure increased marginal illumination, the diameter of the front.

Condition (9) relates to the final positive lens element in the third lens group and sets forth the requirement that should be met in order to achieve effective compensation for coma aberration. This condition is also related to condition (4') and requires that the positive power of the first lens surface in the fourth lens group should be partly carried by the final positive lens in the third group so as to reduce the occurrence of higher-order spherical aberrations. In many of the known zoom lens systems of the four-group type, the final lens in the third lens group is negative. However, if these sytems are so designed as to provide a half view angle of approximately 38° at the short focal distance end and to feature a zoom ratio of approximately 5, the coma aberrations developing at the short and long focal distance ends will have a great chance of becoming opposite in sign, which certainly is unfavorable for the purpose of achieving effective aberrational compensation. In addition, whether the system is at the short or long focal distance end, the sign o coma aberration will be readily reversed at intermediate and maximum view angles. These problems have been solved in the present invention by providing the third lens group with the final lens which is positive lens having a convex surface directed toward the object. If the lower limit of condition (9) is not reached, the balance with condition (4') will be upset and difficulty is involved in achieving compensation for spherical aberration. If the upper limit of condition (9) is exceeded, the intended compensation for coma aberration will not be achieved.

Eight examples of the zoom lens system of the present invention are hereinafter described with reference to data sheets, wherein f denotes a focal length; Z, zoom ratio; $\omega$, half view angle, $f_b$, back focus; r, the radius of curvature of an individual lens surface; d, lens thickness or aerial distance; N, the refractive index of an individual lens element at the d-line; and v, the Abbe number of an individual lens element.

EXAMPLE 1

| F-number 1:3.6~4.6 f = 36.1~204 Z = 5.65 $f_B$ = 45.44~83.43 $\omega$ = 32.4°~5.9° | | | | |
|---|---|---|---|---|
| Surface No. | r | d | N | v |
| 1 | 234.416 | 2.400 | 1.80518 | 25.4 |
| 2 | 61.000 | 2.161 | | |

-continued

| F-number 1:3.6~4.6 f = 36.1~204 Z = 5.65 |||||
| $f_B$ = 45.44~83.43 ω = 32.4°~5.9° |||||
| Surface No. | r | d | N | ν |
|---|---|---|---|---|
| 3 | 94.914 | 7.000 | 1.62041 | 60.3 |
| 4 | −404.399 | 0.100 | | |
| 5 | 51.921 | 7.700 | 1.69680 | 55.5 |
| 6 | −1137.695 | 1.100~35.289 (variable) | | |
| 7 | 271.485 | 1.500 | 1.83481 | 42.7 |
| 8 | 24.146 | 6.681 | | |
| 9 | −69.311 | 1.500 | 1.69680 | 55.5 |
| 10 | 22.879 | 5.500 | 1.84666 | 23.9 |
| 11 | −194.725 | 1.360 | | |
| 12 | −45.288 | 1.500 | 1.77250 | 49.6 |
| 13 | 743.235 | 25.997~3.000 (variable) | | |
| 14 | 4092.828 | 3.700 | 1.48749 | 70.1 |
| 15 | −50.702 | 0.100 | | |
| 16 | 29.231 | 6.100 | 1.48749 | 70.1 |
| 17 | −160.443 | 1.819 | | |
| 18 | −43.204 | 1.500 | 1.83400 | 37.2 |
| 19 | −6989.747 | 10.283~1.500 (variable) | | |
| 20 | 25.909 | 7.000 | 1.56873 | 63.1 |
| 21 | −409.974 | 0.500 | | |
| 22 | 236.417 | 1.500 | 1.80518 | 25.4 |
| 23 | 72.741 | 3.563 | | |
| 24 | 90.389 | 1.500 | 1.83400 | 37.2 |
| 25 | 20.468 | 7.200 | 1.54814 | 45.8 |
| 26 | −92.001 | 0.535 | | |
| 27 | 56.501 | 3.900 | 1.58267 | 46.4 |
| 28 | −244.088 | 8.163 | | |
| 29 | −17.391 | 1.700 | 1.77250 | 49.6 |
| 30 | −28.809 | | | |

$X_{IIL}/X_{IL}$ = 0.154   $\overline{N_{IIn}}$ = 1.768
$r_{IIC}/f_L$ = 0.112   $r_{IVIa}/f_L$ = 0.127
$r_{IVC}/f_L$ = 0.100   $r_{IVEa}/f_L$ = −0.085
$X_{IIIL}/X_{IVL}$ = 0.769

EXAMPLE 2

| F-number 1:3.6~4.6 f = 36.1~204 Z = 5.65 |||||
| $f_B$ = 42.36~87.98 ω = 32.5°~5.9° |||||
| Surface No. | r | d | N | ν |
|---|---|---|---|---|
| 1 | 239.056 | 2.400 | 1.80518 | 25.4 |
| 2 | 60.943 | 1.986 | | |
| 3 | 87.799 | 6.900 | 1.62041 | 60.3 |
| 4 | −446.232 | 0.100 | | |
| 5 | 52.263 | 7.500 | 1.69680 | 55.5 |
| 6 | −1539.288 | 1.100~33.519 (variable) | | |
| 7 | 253.696 | 1.500 | 1.83481 | 42.7 |
| 8 | 24.231 | 7.132 | | |
| 9 | −72.365 | 1.500 | 1.69680 | 55.5 |
| 10 | 22.390 | 5.800 | 1.84666 | 23.9 |
| 11 | −204.482 | 1.771 | | |
| 12 | −39.111 | 1.500 | 1.77250 | 49.6 |
| 13 | ∞ | 24.223~3.007 (variable) | | |
| 14 | −14786.242 | 3.900 | 1.48749 | 70.1 |
| 15 | −46.931 | 0.100 | | |
| 16 | 33.730 | 6.900 | 1.48749 | 70.1 |
| 17 | −74.418 | 1.251 | | |
| 18 | −43.973 | 1.500 | 1.83400 | 37.2 |
| 19 | −1350.440 | 12.702~1.500 (variable) | | |
| 20 | 24.989 | 7.500 | 1.56873 | 63.1 |
| 21 | −1805.014 | 0.500 | | |
| 22 | 731.881 | 1.500 | 1.80518 | 25.4 |
| 23 | 81.179 | 4.267 | | |
| 24 | 79.302 | 1.500 | 1.83400 | 37.2 |
| 25 | 19.901 | 7.300 | 1.54814 | 45.8 |
| 26 | −98.365 | 0.400 | | |
| 27 | 56.519 | 3.468 | 1.58144 | 40.7 |
| 28 | −5453.894 | 8.743 | | |
| 29 | −17.153 | 1.700 | 1.77250 | 49.6 |
| 30 | −27.052 | | | |

$X_{IIL}/X_{IL}$ = 0.289   $\overline{N_{IIn}}$ = 1.768
$r_{IIC}/f_L$ = 0.110   $r_{IVIA}/f_L$ = 0.122
$r_{IVC}/f_L$ = 0.0976   $r_{IVEa}/f_L$ = −0.084

-continued

| F-number 1:3.6~4.6 f = 36.1~204 Z = 5.65 |||||
| $f_B$ = 42.36~87.98 ω = 32.5°~5.9° |||||
| Surface No. | r | d | N | ν |
|---|---|---|---|---|

$X_{IIIL}/X_{IVL}$ = 0.754

EXAMPLE 3

| F-number 1:3.6~4.6 f = 36.1~204 Z = 5.65 |||||
| $f_B$ = 40.84~87.34 ω 32.4°~5.9° |||||
| Surface No. | r | d | N | ν |
|---|---|---|---|---|
| 1 | 212.665 | 2.400 | 1.80518 | 25.4 |
| 2 | 59.801 | 1.682 | | |
| 3 | 79.533 | 7.100 | 1.58913 | 61.0 |
| 4 | −501.029 | 0.100 | | |
| 5 | 52.302 | 7.700 | 1.69680 | 55.5 |
| 6 | −2605.157 | 1.000~32.501 (variable) | | |
| 7 | 311.872 | 1.500 | 1.83481 | 42.7 |
| 8 | 24.494 | 7.720 | | |
| 9 | −82.168 | 1.500 | 1.69680 | 55.5 |
| 10 | 22.118 | 6.200 | 1.84666 | 23.9 |
| 11 | −260.732 | 1.874 | | |
| 12 | −40.014 | 1.500 | 1.77250 | 49.6 |
| 13 | 1919.000 | 23.785~3.155 (variable) | | |
| 14 | 2277.644 | 4.000 | 1.48749 | 70.1 |
| 15 | −47.230 | 0.100 | | |
| 16 | 34.021 | 7.300 | 1.48749 | 70.1 |
| 17 | −82.361 | 1.409 | | |
| 18 | −44.731 | 1.500 | 1.83400 | 37.2 |
| 19 | −2339.268 | 12.371~1.500 (variable) | | |
| 20 | 24.518 | 10.155 | 1.51821 | 65.0 |
| 21 | −89.639 | 0.0 | | |
| 22 | −89.639 | 1.700 | 1.80518 | 25.4 |
| 23 | −629.120 | 3.701 | | |
| 24 | 62.283 | 1.500 | 1.83400 | 37.2 |
| 25 | 18.663 | 7.600 | 1.54072 | 47.2 |
| 26 | −395.740 | 0.200 | | |
| 27 | 69.236 | 3.918 | 1.64769 | 33.8 |
| 28 | −6788.994 | 6.941 | | |
| 29 | −16.241 | 1.700 | 1.77250 | 49.6 |
| 30 | −26.094 | | | |

$X_{IIL}/X_{IL}$ = 0.323   $\overline{N_{IIn}}$ = 1.768
$r_{IIC}/f_L$ = 0.108   $r_{IVIa}/f_L$ = 0.120
$R_{IVC}/f_L$ = 0.0915   $r_{IVEa}/f_L$ = −0.0796
$X_{IIIL}/X_{IVL}$ = 0.766

EXAMPLE 4

| F-number 1:3.6~4.6 f = 36.06~203 Z = 5.63 |||||
| $f_B$ = 39.16~80.35 ω = 32.5°~5.9° |||||
| Surface No. | r | d | N | ν |
|---|---|---|---|---|
| 1 | 220.279 | 2.400 | 1.80518 | 25.4 |
| 2 | 60.634 | 1.980 | | |
| 3 | 89.072 | 6.870 | 1.64000 | 60.1 |
| 4 | −614.070 | 0.100 | | |
| 5 | 51.555 | 7.800 | 1.69680 | 55.5 |
| 6 | −2221.231 | 1.230~34.366 (variable) | | |
| 7 | 334.800 | 1.500 | 1.83481 | 42.7 |
| 8 | 24.406 | 6.930 | | |
| 9 | −64.700 | 1.500 | 1.69680 | 55.5 |
| 10 | 22.500 | 6.100 | 1.84666 | 23.9 |
| 11 | −163.120 | 1.460 | | |
| 12 | −41.075 | 1.500 | 1.80400 | 46.6 |
| 13 | 520.629 | 22.304~3.170 (variable) | | |
| 14 | −540.000 | 3.900 | 1.48749 | 70.1 |
| 15 | −43.200 | 0.100 | | |
| 16 | 34.700 | 7.100 | 1.48749 | 70.1 |
| 17 | −65.500 | 1.020 | | |
| 18 | −42.360 | 1.500 | 1.83400 | 37.2 |
| 19 | −287.519 | 15.502~1.500 (variable) | | |
| 20 | 28.000 | 5.700 | 1.56873 | 63.1 |

-continued

| F-number 1:3.6~4.6 f = 36.06~203 Z = 5.63 | | | | |
|---|---|---|---|---|
| $f_B = 39.16~80.35 \omega = 32.5°~5.9°$ | | | | |
| Surface No. | r | d | N | ν |
| 21 | 103.398 | 0.100 | | |
| 22 | 45.440 | 6.500 | 1.48749 | 70.1 |
| 23 | −68.597 | 2.800 | 1.80518 | 25.4 |
| 24 | −101.335 | 1.410 | | |
| 25 | −1382.845 | 2.300 | 1.83400 | 37.2 |
| 26 | 17.287 | 6.800 | 1.54814 | 45.8 |
| 27 | −415.056 | 0.550 | | |
| 28 | 114.000 | 5.000 | 1.67270 | 32.1 |
| 29 | −114.000 | 6.050 | | |
| 30 | −17.416 | 1.700 | 1.77250 | 49.6 |
| 31 | −28.53 | | | |

$X_{IIL}/X_{IL} = 0.196$  $\overline{N_{IIn}} = 1.7785$
$r_{IIC}/f_L = 0.111$  $r_{IVIa}/f_L = 0.138$
$r_{IVc}/f_L = 0.0852$  $r_{IVEa}/f_L = -0.0858$
$X_{IIIL}/X_{IVL} = 0.660$

EXAMPLE 5

| $F_{NO} = 1:4.0~4.4~4.6$ f = 28.67~60.28~132.00 | | | | |
|---|---|---|---|---|
| $Z = 4.6 \omega = 38.7°~19.3°~9.0°$ $f_B = 36.98~59.53~70.50$ | | | | |
| Surface No. | r | d | N | ν |
| 1 | 607.957 | 2.30 | 1.80518 | 25.4 |
| 2 | 56.671 | 6.00 | | |
| 3 | 124.681 | 5.21 | 1.58913 | 61.0 |
| 4 | −290.130 | 0.10 | | |
| 5 | 55.374 | 6.96 | 1.77250 | 49.7 |
| 6 | −374.170 | 1.00~13.50~36.52 (variable) | | | |
| 7 | 147.629 | 1.60 | 1.83481 | 42.7 |
| 8 | 21.699 | 4.64 | | |
| 9 | −50.941 | 1.50 | 1.71300 | 53.8 |
| 10 | 20.748 | 5.83 | 1.80518 | 25.4 |
| 11 | −50.802 | 1.50 | 1.83481 | 42.7 |
| 12 | 179.202 | 20.71~10.00~3.00 (variable) | | | |
| 13 | 52.911 | 4.59 | 1.64769 | 33.8 |
| 14 | −46.149 | 1.15 | | |
| 15 | −27.218 | 1.70 | 1.84666 | 23.9 |
| 16 | −172.838 | 0.10 | | |
| 17 | 43.086 | 2.72 | 1.69680 | 55.5 |
| 18 | 119.162 | 11.00~5.70~1.00 (variable) | | | |
| 19 | 57.461 | 3.34 | 1.77250 | 49.7 |
| 20 | −709.936 | 0.10 | | |
| 21 | 37.097 | 8.48 | 1.69350 | 53.2 |
| 22 | −38.522 | 2.00 | 1.71736 | 29.5 |
| 23 | −2463.768 | 4.06 | | |
| 24 | 242.418 | 1.70 | 1.83400 | 37.2 |
| 25 | 15.161 | 6.47 | 1.51454 | 54.7 |
| 26 | −99.092 | 0.10 | | |
| 27 | 123.491 | 3.50 | 1.68893 | 31.1 |
| 28 | −35.052 | 1.33 | | |
| 29 | −20.432 | 1.50 | 1.83481 | 42.7 |
| 30 | −88.612 | | | |

$X_{IL}/X_{IVL} = 1.233$  $\overline{N_{IIN}} = 1.794$
$r_{IIC}/f_L = 0.157$  $r_{mEa}/f_L = 0.326$
$r_{IVIa}/f_L = 0.435$  $r_{IVc}/f_L = 0.115$
$r_{IVEa}/f_L = -0.155$

EXAMPLE 6

| $F_{NO} = 1:4.0~4.4~4.6$ f = 28.67~60.45~132.00 | | | | |
|---|---|---|---|---|
| $Z = 4.6 \omega = 38.7°~19.2°~9.0°$ | | | | |
| $f_B = 36.98~59.31 ~ 70.23$ | | | | |
| Surface No. | r | d | N | ν |
| 1 | 603.179 | 2.30 | 1.80518 | 25.4 |
| 2 | 56.533 | 5.99 | | |
| 3 | 125.548 | 5.18 | 1.58913 | 61.0 |
| 4 | −293.229 | 0.10 | | |
| 5 | 55.238 | 6.97 | 1.77250 | 49.7 |
| 6 | −371.690 | 1.00~13.87~36.78 (variable) | | | |
| 7 | 148.723 | 1.60 | 1.83481 | 42.7 |
| 8 | 21.693 | 4.64 | | |
| 9 | −50.900 | 1.50 | 1.71300 | 53.8 |
| 10 | 20.659 | 5.79 | 1.80518 | 25.4 |
| 11 | −52.173 | 0.15 | | |
| 12 | −51.078 | 1.50 | 1.83481 | 42.7 |
| 13 | 193.337 | 20.63~10.00~3.00 (variable) | | | |
| 14 | 52.475 | 4.59 | 1.64769 | 33.8 |
| 15 | −46.239 | 1.15 | | |
| 16 | −27.162 | 1.70 | 1.84666 | 23.9 |
| 17 | −169.834 | 0.10 | | |
| 18 | 43.266 | 2.70 | 1.69680 | 55.5 |
| 19 | 117.995 | 10.81~5.54~1.00 (variable) | | | |
| 20 | 57.079 | 3.34 | 1.77250 | 49.7 |
| 21 | −709.565 | 0.10 | | |
| 22 | 37.173 | 8.50 | 1.69350 | 53.2 |
| 23 | −38.382 | 2.00 | 1.71736 | 29.5 |
| 24 | −1225.402 | 3.92 | | |
| 25 | 232.987 | 1.70 | 1.83400 | 37.2 |
| 26 | 15.101 | 6.46 | 1.51454 | 54.7 |
| 27 | −101.687 | 0.14 | | |
| 28 | 131.000 | 3.48 | 1.68893 | 31.1 |
| 29 | −35.057 | 1.36 | | |
| 30 | −20.254 | 1.50 | 1.83481 | 42.7 |
| 31 | −84.899 | | | |

$X_{IL}/X_{IVL} = 1.251$  $\overline{N_{IIN}} = 1.794$
$r_{IIC}/f_1 = 0.157$  $r_{IIIEa}/f_L = 0.328$
$r_{IVIa}/f_L = 0.432$  $r_{IVc}/f_L = 0.114$
$r_{IVEa}/f_L = -0.153$

EXAMPLE 7

| $F_{NO} = 1:4.0~4.4~4.6$ f = 28.77~60.45~132.00 | | | | |
|---|---|---|---|---|
| $Z = 4.6 \omega = 38.6°~19.3°~9.0°$ | | | | |
| $f_B = 36.98~58.63 ~ 66.57$ | | | | |
| Surface No. | r | d | N | ν |
| 1 | 425.516 | 2.30 | 1.80518 | 25.4 |
| 2 | 53.639 | 5.83 | | |
| 3 | 152.656 | 4.88 | 1.58913 | 61.0 |
| 4 | −292.371 | 0.10 | | |
| 5 | 52.658 | 7.17 | 1.77250 | 49.7 |
| 6 | −338.909 | 1.00~14.36~38.58 (variable) | | | |
| 7 | 141.965 | 1.60 | 1.83481 | 42.7 |
| 8 | 21.556 | 4.63 | | |
| 9 | −52.127 | 1.50 | 1.69680 | 55.5 |
| 10 | 20.489 | 5.66 | 1.80518 | 25.4 |
| 11 | −57.491 | 0.20 | | |
| 12 | −48.391 | 1.50 | 1.83481 | 42.7 |
| 13 | 330.196 | 21.56~10.55~3.00 (variable) | | | |
| 14 | −145.975 | 1.92 | 1.48749 | 70.1 |
| 15 | −83.848 | 0.10 | | |
| 16 | 33.050 | 5.48 | 1.58144 | 40.8 |
| 17 | −90.638 | 1.56 | | |
| 18 | −31.634 | 1.70 | 1.84666 | 23.9 |
| 19 | −165.547 | 0.10 | | |
| 20 | 56.270 | 2.00 | 1.69680 | 55.5 |
| 21 | 91.193 | 10.15~5.15~1.00 (variable) | | | |
| 22 | 53.411 | 3.09 | 1.77250 | 49.7 |
| 23 | 1075.547 | 0.10 | | |
| 24 | 30.976 | 11.00 | 1.67790 | 55.3 |
| 25 | −36.545 | 2.00 | 1.71736 | 29.5 |
| 26 | −61.635 | 0.76 | | |
| 27 | −109.923 | 1.70 | 1.83400 | 37.2 |
| 28 | 14.244 | 6.24 | 1.51454 | 54.7 |
| 29 | −338.736 | 0.10 | | |
| 30 | 154.640 | 3.43 | 1.68893 | 31.1 |
| 31 | −37.261 | 1.96 | | |
| 32 | −17.782 | 1.50 | 1.83481 | 42.7 |
| 33 | −42.963 | | | |

-continued $F_{NO} = 1:4.0\sim4.4\sim4.6$  $f = 28.77\sim60.45\sim132.00$
$Z = 4.6$  $\omega = 38.6°\sim19.3°\sim9.0°$
$f_B = 36.98\sim58.63\sim66.57$

| Surface No. | r | d | N | ν |
|---|---|---|---|---|

$X_{IL}/X_{IVL} = 1.334$  $\overline{N_{IIn}} = 1.768$
$r_{IIC}/f_L = 0.155$  $r_{mea}/f_L = 0.426$
$r_{IVIa}/f_L = 0.405$  $r_{IVC}/f_L = 0.108$
$r_{IVEa}/f_L = -0.135$

EXAMPLE 8

$F_{NO} = 1:4.0\sim4.4\sim4.6$  $f = 28.80\sim60.09\sim132.00$
$Z = 4.6$  $\omega = 38.6°\sim19.4°\sim9.0°$
$f_B = 37.03\sim58.54\sim66.37$

| Surface No. | r | d | N | ν |
|---|---|---|---|---|
| 1 | 480.235 | 2.30 | 1.80518 | 25.4 |
| 2 | 52.870 | 6.60 | | |
| 3 | 156.026 | 4.99 | 1.56873 | 63.2 |
| 4 | −245.648 | 0.10 | | |
| 5 | 53.012 | 7.31 | 1.77250 | 49.7 |
| 6 | −292.479 | 1.00~13.50~37.67 (variable) | | |
| 7 | 154.112 | 1.60 | 1.83481 | 42.7 |
| 8 | 22.008 | 4.69 | | |
| 9 | −47.597 | 1.50 | 1.69680 | 55.5 |
| 10 | 22.316 | 5.54 | 1.80518 | 25.4 |
| 11 | −50.674 | 0.10 | | |
| 12 | −47.317 | 1.50 | 1.83481 | 42.7 |
| 13 | 618.537 | 23.50~11.78~3.40 (variable) | | |
| 14 | −183.693 | 1.84 | 1.48749 | 70.1 |
| 15 | −108.853 | 0.10 | | |
| 16 | 30.106 | 4.94 | 1.58921 | 41.1 |
| 17 | −90.296 | 1.46 | | |
| 18 | −33.203 | 1.70 | 1.84666 | 23.9 |
| 19 | −409.801 | 0.10 | | |
| 20 | 67.243 | 1.61 | 1.69680 | 55.5 |
| 21 | 107.907 | 9.45~4.93~1.00 (variable) | | |
| 22 | 54.193 | 2.96 | 1.77250 | 49.7 |
| 23 | 493.896 | 0.10 | | |
| 24 | 29.377 | 12.78 | 1.67000 | 57.3 |
| 25 | −52.949 | 0.73 | | |
| 26 | −66.613 | 1.70 | 1.83400 | 37.2 |
| 27 | 14.806 | 6.56 | 1.51112 | 60.5 |
| 28 | −64.852 | 0.10 | | |
| 29 | 88.740 | 3.54 | 1.68893 | 31.1 |
| 30 | −40.359 | 1.80 | | |
| 31 | −18.936 | 1.50 | 1.83481 | 42.7 |
| 32 | −86.903 | | | |

$X_{IL}/X_{IVL} = 1.277$  $\overline{N_{IIn}} = 1.768$
$r_{IIC}/f_L = 0.169$  $r_{IIIEa}/f_L = 0.509$
$r_{IVIa}/f_L = 0.411$  $r_{IVC}/f_L = 0.112$
$r_{IVEa}/f_L = -0.143$

I claim:

1. A zoom lens system capable of wide-angle viewing for a high zoom ratio that comprises, in order from the object side, a first lens group having a positive focal length, a second lens group having a negative focal length, a third lens group having a positive focal length, and a fourth lens group having a positive focal length, with all of these groups being displaced to change the focal length of the overall system while the position of the image plane is held constant, characterized in that: said second lens group includes a three-unit-four-element configuration comprising, in order from the object side, a negative lens element having a concave surface of large curvature on the image side, a biconcave negative lens element that is cemented to a positive lens element to provide a cemented surface that has a large curvature and which convex toward the object, and a negative lens element whose surface on the object side has a large curvature and is concave toward the object; said fourth lens group comprises, in order from the object side, a front subgroup having a positive focal length which is composed of at least one positive lens element having a convex surface on the object side and at least one negative lens element, a middle subgroup comprising a negative lens element that is cemented to a positive lens element to provide a cemented surface that has a large curvature and which is divergent and convex toward the object, and a rear subgroup comprising a positive lens element and a negative meniscus lens element whose surface on the object side has a large curvature and is concave toward the object; said lens system satisfying the following conditions:

$$0.1 < X_{IIIL}/X_{IL} < 0.4 \quad (1)$$

$$1.7 < \overline{N_{IIn}} \quad (2)$$

$$0.08 < r_{IIC}/f_L < 0.15 \quad (3)$$

$$0.09 < r_{IVIa}/f_L < 0.18 \quad (4)$$

$$0.07 < r_{IVC}/f_L < 0.14 \quad (5)$$

$$-0.12 < r_{IVEa}/f_L < -0.06 \quad (6)$$

where $X_{IL}$: the amount of displacement for bringing the first lens group to be positioned at the long focal distance end;

$X_{IIL}$: the amount of displacement for bringing the second lens group to be positioned at the long focal distance end;

$\overline{N_{IIn}}$: the average of the refractive indices, at the d-line of the negative lens elements in the second lens group;

$f_L$: the focal length of the overall system when it is at the long focal distance end;

$r_{IIC}$: the radius of curvature of the cemented surface of the cemented lens in the second lens group;

$r_{IVIa}$: the radius of curvature of the surface on the object side of the positive lens element that is closest to the object of the lens elements in the fourth lens group;

$r_{IVC}$: the radius of curvature of the cemented surface of the middle subgroup (cemented lens) of the fourth lens group; and $r_{IVEa}$: the radius of curvature of the surface on the object side of the negative lens element that is closest to the image of the lens elements in the fourth lens group.

2. A zoom lens system according to claim 1 wherein the first, third and fourth lens groups are so designed that they make a montonic movement toward the object when they are displaced from the short focal distance end to the long focal distance end, and the overall lens system satisfies the following condition:

$$0.5 < X_{IIIL}/X_{IVL} < 0.9 \quad (7)$$

where $X_{IIIL}$: the amount of displacement for bringing the third lens group to be positioned at the long focal distance end; and X_{IVL}: the amount of displacment for bringing the fourth lens group to be positioned at the short focal distance end.

3. A zoom lens system according to claim 1 wherein the first and fourth lens groups are displaced ensemble for performing zooming.

4. A zoom lens system according to claim 1, wherein said front subgroup of said fourth lens group includes two positive lens elements.

5. A zoom lens system capable of wide-angle viewing for a high zoom ratio that comprises, in order from the object side, a first lens group having a positive focal length, a second lens group having a negative focal length, a third lens group having a positive focal length, and a fourth lens group having a positive focal length, with all of these groups being displaced to change the focal length of the overall system while the position of the image plane is held constant, characterized in that:

said second lens group includes a three-unit-four-element configuration comprising, in order from the object side, a negative lens element having a concave surface of large curvature on the image side, a biconcave negative lens element that is cemented to a positive lens element to provide a cemented surface that has a large curvature and which is convex toward the object, and a negative lens element whose surface on the object side has a large curvature and is concave toward the object;

said third lens group comprises, in order from the object side, at least one positive lens element, a negative lens element whose surface on the object side has a large curvature and is concave toward the object, and a positive lens element whose surface on the object side is convex toward the object;

said fourth lens group comprises, in order from the object side, a front subgroup having a positive focal length which is of the two-unit-three-element configuration that is composed of positive lens element having a convex surface on the object side, and a positive cemented lens formed of a biconvex lens element and a negative lens element, a middle subgroup composed of a negative lens element that is cemented to a positive lens element to provide a cemented surface that has a large curvature and which is divergent convex toward the object, and a rear subgroup composed of a positive lens element and a negative meniscus lens element whose surface on the object side has a large curvature and is concave toward the object;

said lens system satisfying the following conditions:

$$1.7 < \overline{N_{IIn}} \quad (2)$$

$$0.1 < r_{IIC}/f_L < 0.25 \quad (3')$$

$$0.03 < R_{IVIa}/f_L < 0.6 \quad (4')$$

$$0.07 < r_{IVC}/f_L < 0.16 \quad (5')$$

$$-0.2 < r_{IVEa}/f_L < -0.1 \quad (6')$$

$$1.05 < X_{IL}/X_{IVL} < 1.5 \quad (8)$$

$$0.2 < r_{IIIEa}/f_L < 0.7 \quad (9)$$

where

X_{IL}: the amount of displacement for bringing the first lens group to be positioned at the long focal distance end;

XIVL: the amount of displacement for bringing the fourth lens group to be positioned at the long focal distance end;

$\overline{N_{IIn}}$: the average of the refractive indices, at the d-line, of the negative lens elements in the second lens group;

f_L: the focal length of the overall system when it is at the long focal distance end;

r_{IIC}: the radius of curvature of the cemented surface of the cemented lens in the second lens group (provided that the cemented surface on the object side is meant if there are two cemented surfaces in the second lens group);

r_{IIIEa}: the radius of curvature of the surface on the object side of the positive lens element that is closest to the image of the lens elements in the third lens group;

r_{IVIa}: the radius of curvature of the surface on the object side of the positive lens element that is closest to the object of the lens elements in the fourth lens group;

r_{IVC}: the radius of curvature of the cemented surface of the middle subgroup (cemented lens) of the fourth lens group; and r_{IVEa}: the radius of curvature of the surface on the object side of the negative lens element that is closest to the image of the lens elements in the fourth lens group.

6. A zoom lens system according to claim 5, wherein said third lens group includes two positive lens elements on the object side thereof.

7. A zoom lens system capable of wide-angle viewing for a high zoom ratio that comprises, in order from the object side, a first lens group having a positive focal length, a second lens group having a negative focal length, a third lens group having a positive focal length, and a fourth lens group having a positive focal length, with all of these groups being displaced to change the focal length of the overall system while the position of the image plane is held constant, characterized in that:

said second lens group includes a two-unit-four-element configuration in which three of the four elements that are on the image side are cemented together;

said third lens group comprises, in order from the object side, at least one positive lens element, a negative lens element whose surface on the object side has a large curvature and is concave toward the object, and a positive lens element whose surface on the object side is convex toward the object;

said fourth lens group comprises, in order from the object side, a front subgroup having a positive focal length which is of the two-unit-three-element configuration that is composed of positive lens element having a convex surface on the object side, and a positive cemented lens formed of a biconvex lens element and a negative lens element, a middle subgroup composed of a negative lens element that is cemented to a positive lens element to provide a cemented surface that has a large curvature and which is divergent convex toward the object, and a rear subgroup composed of a positive lens element and a negative meniscus lens element whose surface on the object side has a large curvature and is concave toward the object;

said lens system satisfying the following conditions:

$$1.7 < \overline{N_{IIN}} \quad (2)$$

$$0.1 < r_{IIC}/f_L < 0.25 \qquad (3')$$

$$0.03 < r_{IVIa}/f_L < 0.6 \qquad (4')$$

$$0.07 < r_{IVC}/f_L < 0.16 \qquad (5')$$

$$-0.2 < r_{IVEa}/f_L < -0.1 \qquad (6')$$

$$1.05 < X_{IL}/X_{IVL} < 1.5 \qquad (8)$$

$$0.2 < r_{IIIEa}/f_L < 0.7 \qquad (9')$$

where $X_{IL}$: the amount of displacement for bringing the first lens group to be positioned at the long focal distance end;

$X_{IVL}$: the amount of displacement for bringing the fourth lens group to be positioned at the long focal distance end;

$\overline{N_{IIn}}$: the average of the refractive indices, at the d-line, of the negative lens elements in the second lens group;

$f_L$: the focal length of the overall system when it is at the long focal distance end;

$r_{IIC}$: the radius of curvature of the cemented surface of the cemented lens in the second lens group (provided that the cemented surface on the object side is meant if there are two cemented surfaces in the second lens group);

$r_{IIIEa}$: the radius of curvature of the surface on the object side of the positive lens element that is closest to the image of the lens elements in the third lens group;

$r_{IVIa}$: the radius of curvature of the surface on the object side of the positive lens element that is closest to the object of the lens elements in the fourth lens group;

$r_{IVC}$: the radius of curvature of the cemented surface of the middle subgroup (cemented lens) of the fourth lens group; and $r_{IVEa}$: the radius of curvature of the surface on the object side of the negative lens element that is closest to the image of the lens element in the fourth lens group.

8. A zoom lens system according to claim 7, wherein said third lens group includes two positive lens elements on the object side thereof.

9. A zoom lens system capable of wide-angle viewing for a high zoom ratio that comprises, in order from the object side, a first lens group having a positive focal length, a second lens group having a negative focal length, a third lens group having a positive focal length, and a fourth lens group having a positive focal length, with all of these groups being displaced to change the focal length of the overall system while the position of the image plane is held constant, characterized in that: said second lens group includes a three-unit-four-element configuration comprising, in order from the object side, a negative lens element having a concave surface of large curvature on the image side, a biconcave negative lens element that is cemented to a positive lens element to provide a cemented surface that has a large curvature and which is convex toward the object, and a negative lens element whose surface on the object side has a large curvature and is concave toward the object;

said third lens group comprises, in order from the object side, at least one positive lens element, a negative lens element whose surface on the object side has a large curvature and is concave toward the object, and a positive lens element whose surface on the object side is convex toward the object;

said fourth lens group comprises, in order from the object side, a front subgroup having a positive focal length which is of the two-unit-two-element configuration that is composed of a positive lens element having a convex surface on the object side and a single positive lens element, a middle subgroup composed of a negative lens element that is cemented to a positive lens element to provide a cemented surface that has a large curvature and which is convex toward the object, and a rear subgroup composed of a positive lens element and a negative meniscus lens element whose surface on the object side has a large curvature and is concave toward the object;

said lens system satisfying the following conditions:

$$1.7 < \overline{N_{IIN}} \qquad (2)$$

$$0.1 < r_{IIC}/f_L < 0.25 \qquad (3')$$

$$0.03 < r_{IVIa}/f_L < 0.6 \qquad (4')$$

$$0.07 < r_{IVC}/f_L < 0.16 \qquad (5')$$

$$-0.2 < r_{IVEa}/f_L < -0.1 \qquad (6')$$

$$1.05 < X_{IL}/X_{IVL} < 1.5 \qquad (8)$$

$$0.2 < r_{IIIEa}/f_L < 0.7 \qquad (9)$$

where $X_{IL}$: the amount of displacement for bringing the first lens group to be positioned at the long focal distance end;

$X_{IVL}$: the amount of displacement for bringing the fourth lens group to be positioned at the long focal distance end;

$\overline{N_{IIn}}$: the average of the refractive indices, at the d-line, of the negative lens elements in the second lens group;

$f_L$: the focal length of the overall system when it is at the long focal distance end;

$r_{IIC}$: the radius of curvature of the cemented surface of the cemented lens in the second lens group (provided that the cemented surface on the object side is meant if there are two cemented surfaces in the second lens group);

$r_{IIIEa}$: the radius of curvature of the surface on the object side of the positive lens element that is closest to the image of the lens elements in the third lens group;

$r_{IVIa}$: the radius of curvature of the surface on the object side of the positive lens element that is closest to the object of the lens elements in the fourth lens group;

$r_{IVC}$: the radius of curvature of the cemented surface of the middle subgroup (cemented lens) of the fourth lens group; and $r_{IVEa}$: the radius of curvature of the surface on the object side of the negative lens element that is closest to the image of the lens elements in the fourth lens group.

10. A zoom lens system according to claim 9, wherein said third lens group includes two positive lens elements on the object side thereof.

11. A zoom lens system capable of wide-angle viewing for a high zoom ratio that comprises, in order from the object side, a first lens group having a positive focal length, a second lens group having a negative focal length, a third lens group having a positive focal length, and a fourth lens group having a positive focal length, with all of these groups being displaced to change the focal length of the overall system while the position of the image plane is held constant, characterized in that:
said second lens group includes a two-unit-four-element configuration in which three of the four elements that are on the image side are cemented together;
said third lens group comprises, in order from the object side, at least one positive lens element, a negative lens element whose surface on the object side has a large curvature and is concave toward the object, and the positive lens element whose surface on the object side is convex toward the object;
said fourth lens group comprises, in order from the object side, a front subgroup having a positive focal length which is of the two-unit-two-element configuration that is composed of a positive lens element having a convex surface on the object side and a single positive lens element, a middle subgroup composed of a negative lens element that is cemented to a positive lens element to provide a cemented surface that has a large curvature and which is divergent convex toward the object, and a rear subgroup composed of a positive lens element and a negative meniscus lens element whose surface on the object side has a large curvature and is concave toward the object;
said lens system satisfying the following conditions:

$$1.7 < \overline{N_{IIn}} \tag{2}$$

$$0.1 < r_{IIC}/f_L < 0.25 \tag{3'}$$

$$0.03 < r_{IVIa}/f_L < 0.6 \tag{4'}$$

$$0.07 < r_{IVC}/f_L < 0.16 \tag{5'}$$

$$-0.2 < r_{IVEa}/f_L < -0.1 \tag{6'}$$

$$1.05 < X_{IL}/X_{IVL} < 1.5 \tag{8}$$

$$0.2 < r_{IIIEa}/f_L < 0.7 \tag{9}$$

where
$X_{IL}$: the amount of displacement for bringing the first lens group to be positioned at the long focal distance end;
$X_{IVL}$: the amount of displacement for bringing the fourth lens group to be positioned at the long focal distance end;
$\overline{N_{IIN}}$: the average of the refractive indices, at the d-line, of the negative lens elements in the second lens group;
$f_L$: the focal length of the overall system when it is at the long focal distance end;
$r_{IIC}$: the radius of curvature of the cemented surface of the cemented lens in the second lens group (provided that the cemented surface on the object side is meant if there are two cemented surfaces in the second lens group);
$r_{IIIEa}$: the radius of curvature of the surface on the object side of the positive lens element that is closest to the image of the lens elements in the third lens group;
$r_{IVIa}$: the radius of curvature of the surface on the object side of the positive lens element that is closest to the object of the lens elements in the fourth lens group;
$r_{IVC}$: the radius of curvature of the cemented surface of the middle subgroup (cemented lens) of the fourth lens group; and
$r_{IVEa}$: the radius of curvature of the surface on the object side of the negative lens element that is closest to the image of the lens elements in the fourth lens group.

12. A zoom lens system according to claim 11, wherein said third lens group includes two positive lens elements on the object side thereof.

* * * * *